United States Patent
Li et al.

(10) Patent No.: US 11,368,614 B2
(45) Date of Patent: Jun. 21, 2022

(54) IMAGING METHOD, DEVICE AND SYSTEM

(71) Applicant: GeneMind Biosciences Company Limited, Shenzhen (CN)

(72) Inventors: Linsen Li, Shenzhen (CN); Ruitao Sun, Shenzhen (CN); Jiahong Xu, Shenzhen (CN); Zhiliang Zhou, Shenzhen (CN); Zefei Jiang, Shenzhen (CN); Qin Yan, Shenzhen (CN)

(73) Assignee: GeneMind Biosciences Company Limited, Shenzhen (CN)

( * ) Notice: Subject to any disclaimer, the term of this patent is extended or adjusted under 35 U.S.C. 154(b) by 0 days.

(21) Appl. No.: 17/262,663

(22) PCT Filed: Jul. 23, 2019

(86) PCT No.: PCT/CN2019/097272
§ 371 (c)(1),
(2) Date: Jan. 22, 2021

(87) PCT Pub. No.: WO2020/020148
PCT Pub. Date: Jan. 30, 2020

(65) Prior Publication Data
US 2021/0266469 A1    Aug. 26, 2021

(30) Foreign Application Priority Data

Jul. 23, 2018 (CN) .................. 201810813660.X
Jul. 23, 2018 (CN) .................. 201810814359.0

(51) Int. Cl.
*H04N 5/232* (2006.01)
*G02B 21/24* (2006.01)

(52) U.S. Cl.
CPC ...... *H04N 5/232125* (2018.08); *G02B 21/245* (2013.01)

(58) Field of Classification Search
CPC .................. H04N 5/23212; H04N 5/232125
(Continued)

(56) References Cited

U.S. PATENT DOCUMENTS 7,768,571 B2    8/2010  Kim et al.
2008/0266440 A1*  10/2008  Yazdanfar .......... G02B 21/244
                                        348/340
(Continued)

FOREIGN PATENT DOCUMENTS

CN    103323939 A    9/2013
CN    105827944 A    8/2016
(Continued)

*Primary Examiner* — Anthony J Daniels
(74) *Attorney, Agent, or Firm* — Seed IP Law Group LLP

(57) ABSTRACT

The present disclosure discloses a method and a system for imaging. The method for imaging objects using the system for imaging. The system for imaging comprises a lens. The objects comprise a first object, a second object and a third object located at different positions on a first preset track. The method for imaging comprises: allowing the lens and the first preset track to move relatively in a first predetermined relationship to acquire a clear image of the third object using the system for imaging without focusing, the first predetermined relationship is determined by a focal plane position of the first object and a focal plane position of the second object. The aforementioned method for imaging is high in imaging efficiency and is capable of fast focusing according to the first predetermined relationship even if focus tracking fails so that the blurring of a photographed image due to defocusing is avoided.

19 Claims, 9 Drawing Sheets

(58) Field of Classification Search
USPC .................................................. 348/345, 349
See application file for complete search history.

(56) References Cited

U.S. PATENT DOCUMENTS

| | | | |
|---|---|---|---|
| 2010/0157086 A1* | 6/2010 | Segale | G01B 11/24 |
| | | | 348/222.1 |
| 2014/0300724 A1 | 10/2014 | Olson et al. | |
| 2016/0370565 A1* | 12/2016 | Bredno | G02B 21/006 |
| 2017/0064184 A1 | 3/2017 | Tsai | |
| 2019/0204577 A1* | 7/2019 | Faris | H04N 5/2256 |
| 2019/0302093 A1* | 10/2019 | Hsu | H04N 5/2259 |

FOREIGN PATENT DOCUMENTS

| | | |
|---|---|---|
| CN | 106375647 A | 2/2017 |
| CN | 106610553 A | 5/2017 |
| CN | 107250873 A | 10/2017 |
| CN | 207215686 U | 4/2018 |
| EP | 1533996 A1 | 5/2005 |
| EP | 1691541 A2 | 8/2006 |
| EP | 1865354 A1 | 12/2007 |
| EP | 2813971 A2 | 12/2014 |

\* cited by examiner

IMAGING METHOD, DEVICE AND SYSTEM

TECHNICAL FIELD

The present disclosure relates to the field of optical detection, and in particular to a method for imaging, a device for imaging, and a system for imaging.

BACKGROUND

In the related art, each time when photographing, a camera will quickly adjust the focus to get the clearest focal plane, and thus a sharp/clear picture can be acquired. This process is referred to as focus tracking.

However, when photographing with a camera in practical application, there might be some outside interferences. For example, when photographing, the camera fails to track the focus due to the existence of scatter light around an object or dust or scratches on the surface of the object, and in this case, the image will be blurred if the camera cannot retrack the focus. For example, when a camera is used to perform sequence determination, if an object is a nucleic acid molecule in a flowcell, it is easy for the camera to fail to track the focus when, for example, there are bubbles and agglomerates of fluorescent impurities in the liquid inside the photographed flowcell or dust and scratches on the surface of the flowcell.

SUMMARY

Sequencing platforms for obtaining nucleic acid information based on imaging, such as currently commercially available second-generation or third-generation sequencing platforms for obtaining nucleic acid information by photographing, comprise the process of photographing a nucleic acid placed in a reactor using an system for imaging.

Commonly, the reactor is also called a flowcell, which may comprise one or more parallel channels for a reagent to get into and out of and for carrying the reagent so as to form an environment needed by sequence determination reaction. The flowcell may be made by sticking two pieces of glass. The sequencing process comprises multiple rounds of camera photographing for a fixed region of the flowcell. The region photographed each time may be called a FOV (field of view), each round of photographing may be called a cycle, and the reintroduction of reagent is involved between two cycles to perform a chemical reaction.

In the normal photographing process, the camera can succeed, in most cases, in automatically tracking the focus, i.e., finding the position of the clearest focal plane. When there's interference, the camera may fail to track the focus.

FIGS. 1-3 show data of successful focus tracking and abnormal focus tracking or unsuccessful focus tracking in an experiment.

Taking continuously photographing two rows of FOVs in the same cycle as an example, the coordinates of the altitude (Z value) of an objective were recorded during photographing. As shown in FIG. 1, the horizontal axis is the serial numbers of FOVs, the first half FOVs are photographed in an order from the left side to right side of a flowcell and the second half FOVs are photographed from the right to the left in another row. The vertical axis is the distance of the objective of a microscope from a camera, i.e., Z value (unit: um); the negative values indicate that the objective of the microscope is located under the camera; and the larger the absolute value of the Z value, the farther the objective is away from the camera.

FIG. 1 shows a Z value curve when 300 FOV images are successfully photographed with focus tracking. FIG. 2 shows a Z value curve when 200 photographed FOV images comprise partial focus tracking abnormalities (represented as partial Z value abnormalities), and in this case, the images which correspond to the abnormal portions of the curve shown as the convex portions in the curve are unclear/blurred images.

Due to the certain limitation of camera focus tracking, defocusing could easily take place in the event of interference. After defocusing, because the objective was far away from a focal plane, that is, the distance between the objective and the focal plane position was too far when photographing subsequent FOVs with focus tracking, the objective could not return to the focal plane even if the interference was eliminated. This case is shown as FIG. 3. In FIG. 3, the first 1 to 200 FOVs belong to a cycle, and the rest of the FOVs belong to another cycle. As shown in FIG. 3, after the 268th FOV (located in the first row in another cycle), focus tracking failed, and after interference disappeared, focus retracking still failed before the end of the cycle.

Focus tracking failure means a blurred image, which will cause information loss. Therefore, this is a problem which must be solved. In reality, although interference cannot be completely eliminated, generally it is hoped that at least a clear image can still be acquired after interference disappears.

By analyzing a lot of data involving successful focus tracking and abnormal focus tracking, it has been discovered that when the objective is fixed, a plurality of Z value curves corresponding to a plurality of FOVs being photographed with same normal focus tracking in different cycles (i.e., different times) show a certain law. FIG. 4 shows Z value curves corresponding to clear images acquired by photographing 300 FOVs with normal focus tracking in four different cycles.

Two laws are discovered:

(1) For the same position (FOV), there might be different focal planes in different cycles; however, relative to other FOVs in the same cycle, the relative position of its focal plane is basically unchanged. That is, in terms of physical positions, the focal planes of different FOVs in the same cycle are correlated.

(2) In the drawing, half of the 300 FOVs of each curve are photographed from the left side to right side of a row of the flowcell, while the other half are photographed from the right side to the left side in another row; and due to the deformation of the flowcell and/or the altitude difference between the left side and the right side, the focal planes of a plurality of continuous FOVs in the same direction of the same row (e.g., from the left to the right or from the right to the left) show a certain law, which can fit a straight line well.

It is guessed that the aforementioned laws result from the following possible causes: because the same FOV needs to be repeatedly photographed in different cycles, after heating and introduction of reagent, the internal pressure of the flowcell change, and the whole focal plane shift. Relative to the whole flowcell, each FOV is very small, so the surface evenness of each FOV can be regarded to be unchanged, which means that the relative focal plane positions of adjacent FOVs are unchanged.

Based on the aforementioned discovered laws, a set of algorithm is developed, which enable a camera to have a focal plane prediction function with the aid of a software algorithm without replacing hardware. Specifically, for example, in cycle 1, for a plurality of FOVs located on the same preset track (a first preset track, e.g., the same row), focal planes of two of the FOVs can be obtained with focusing, the focal plane difference between the focal planes is calculated, a relationship (e.g., a first predetermined relationship) is obtained by linear fitting, and the focal plane positions of the other FOVs in the row are predicted using the relationship. For cycle 2 and subsequent cycles, by memorizing the normally focused focal plane of any FOV in the aforementioned cycle 1 or any of previous cycles and then focusing to determine the focal plane position of the FOV in the current cycle, relationships can be established by linear regression to predict the focal plane of any other FOV in the current cycle.

The establishment of a relationship by linear regression is expressed as formula (a): $y=kx+b$, and slope k (also referred to as change tendency k) and an intercept b (also referred to as basic offset b) need to be determined. Based on the aforementioned law (1), it can be known that k is equal to 1, so formula (a) can be converted into formula (b): $y=x+b$, and b can be determined based on the relative positions and Z values of focal planes of any two FOVs on the same track in the same cycle.

For example, for the cycle 1, the basic offset b may be calculated by an overall focal plane difference (e.g., from one end of the track to the other end of the track). Specifically, cyc1FovZ(r) and cyc1FovZ(1), which respectively represent Z values of the focal plane positions of two objects (referred to as two positions or two FOVs) at one end and the other end of a track in cycle 1, are obtained with focusing, so that an intercept can be calculated according to $b=(cyc1FovZ(r)-cyc1FovZ(1))/FovNum$, wherein FovNum denotes the number of FOVs between the two positions of cyc1FovZ(r) and cyc1FovZ(1). Formula (b) can be used to predict cyc1FovZ(n+1) of the cycle 1, cyc1FovZ(n) and cyc1FovZ(n+1) in (b) denote two adjacent positions (FOVs) and cyc1FovZ(n+1) is relatively closer to cyc1FovZ(r), and cyc1FovZ(n) can be obtained with focusing.

It should be noted that b can be determined by the focal plane information of two FOVs on the same track. Moreover, determined formula (b) and the focal plane coordinate information of any focused FOV can also be used. Here, for example, the determined relationship (b) and any value among determined cyc1FovZ(r) and cyc1FovZ(1) are used to determine cyc1FovZ(n+1).

After the linear relationship of one cycle is determined, for the subsequent photographing of any cycle of the same track/the same FOVs, the focal plane position of any FOV in the current cycle can be predicted based on the determined linear relationship and the focal plane position of any one FOV in the current cycle. For example, the focal plane position of Fov(n+1) (the (N+1)th FOV or the FOV at the (N+1)th position) in the current cycle is predicted using the focal plane position of Fov(n) (the Nth FOV or the FOV at the Nth position) in the same cycle, and the Z value curFovZ(n) of the Nth FOV can be substituted as a dependent variable into formula (b), and the obtained y is curFovZ(n+1).

In addition, after the linear relationship of one cycle is determined, for the subsequent photographing of any cycle of the same track/the same FOVs, the focal plane positions of two FOVs in the cycle and the focal plane position of one of the same FOVs in the current cycle can also be determined based on the determined linear relationship to predict the focal plane position of the other of the same FOVs in the current cycle. For example, formula (b) is determined in the previous cycle; the focal plane position of Fov(n+1) (the (N+1)th FOV or the FOV at the (N+1)th position) in the current cycle is predicted using the focal plane position of Fov(n) (the Nth FOV or the FOV at the Nth position) in the same cycle; the focal plane positions of Fov(n) and Fov(n+1) in the previous cycle, which are respectively represented by preFovZ(n) and preFovZ(n+1), can be determined by formula (b), and curFovZ(n+1) is determined using formula (c): $curFovZ(n+1)=curFovZ(n)+(preFovZ(n+1)-preFovZ(n))$.

It should be noted that the discovery and explanation of the aforementioned laws and linear relationships as schematically established relationships are merely intended to facilitate description or understanding. It can be understood by those skilled in the art that the first preset track may be a straight line or a curve, and any curve may be regarded as the fitting of a plurality of segments. In this regard, it is believed that, through the aforementioned illustration of the related scenarios (including the discovery of the laws and the establishment of the relationships) of the present disclosure, for the case that the first preset track is a curve, those skilled in the art can follow the idea of the present disclosure to regard the curve-shaped first preset track as a group of segments and correspondingly establish a first preset relationship including a group of linear relationships so as to predict the focal plane positions of objects on the track without focusing.

Without replacing hardware, the camera can return to the vicinity of a focal plane by the method for imaging of the present embodiment and then start photographing. Based on the discovery and the explanation above, the present disclosure provides a method for imaging, an imaging device, a system for imaging, and a sequencing system.

The method for imaging according to an embodiment of the present disclosure images an object using the system for imaging. The system for imaging comprises a lens. The object comprises a first object, a second object and a third object located at different positions on a first preset track. The method for imaging comprises: allowing the lens and the first preset track to move relatively in a first predetermined relationship to acquire a clear image of the third object using the system for imaging without focusing, wherein the first predetermined relationship is determined by a focal plane position of the first object and a focal plane position of the second object.

The system for imaging according to an embodiment of the present disclosure images an object. The system for imaging comprises a lens and a control device. The object comprises a first object, a second object and a third object located at different positions on a first preset track. The control device is used to: allow the lens and the first preset track to move relatively in a first predetermined relationship to acquire a clear image of the third object using the system for imaging without focusing, wherein the first predetermined relationship is determined by a focal plane position of the first object and a focal plane position of the second object.

In the aforementioned method for imaging and system for imaging, the first predetermined relationship is determined by the focusing positions of the first object and the second object, and when other objects on the first preset track are imaged, focal planes can be directly predicted according to the first predetermined relationship to acquire a clear image of the third object without focusing. The method for imaging is particularly suitable for a scenario where there are a lot of objects and it is desired to quickly and continuously acquire images of these objects. The method is high in imaging efficiency and is able to accurately determine the focal plane positions of the subsequent objects to acquire the image information of the subsequent objects in continuous image acquisition even if the system for imaging fails to track the focus. The method used in cooperation with a focus tracking system of the system for imaging can provide a remedy in the event that the focus tracking system cannot normally track the focus again after it fails to track the focus.

The sequencing device according to an embodiment of the present disclosure comprises the system for imaging of the aforementioned embodiment.

The computer-readable storage medium according to an embodiment of the present disclosure is configured for storing a program for execution by a computer, and the execution of the program comprises implementing the steps of the method according to the aforementioned embodiment. The computer-readable storage medium may include: read-only memory, random access memory, magnetic disk, optical disk, or the like.

The system for imaging according to an embodiment of the present disclosure is configured for imaging objects, wherein the system for imaging comprises a lens and a control device, the objects comprise a first object, a second object and a third object located at different positions on a first preset track, the control device comprises computer-executable programs, and the execution of the computer-executable programs comprises implementing the steps of the method according to the aforementioned embodiment.

The computer program product according to an embodiment of the present disclosure comprises instructions, which enable a computer to implement the steps of the method according to the aforementioned embodiment when executed by the computer.

The additional aspects and advantages of the embodiments of the present disclosure will be partially set forth in the following description, and will partially become apparent from the following description or be appreciated by practice of the embodiments of the present disclosure.

BRIEF DESCRIPTION OF THE DRAWINGS

The aforementioned and/or additional aspects and advantages of embodiments of the present disclosure will become apparent and easily understood from the description of the embodiments in reference to the following drawings, among which.

DETAILED DESCRIPTION

Figure 1:
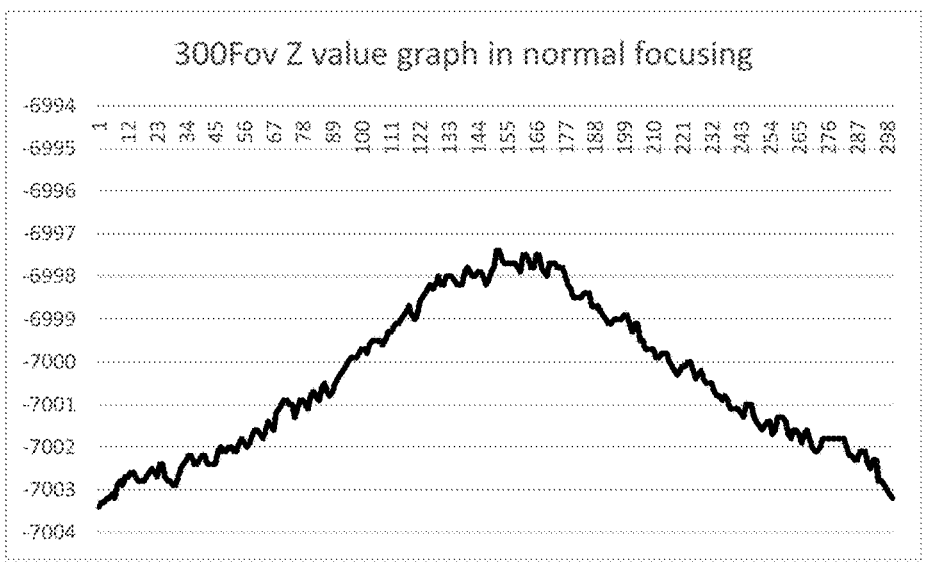
FIG. 1 is a Z value graph when focus tracking succeeds during sequence determination.
Figure 2:
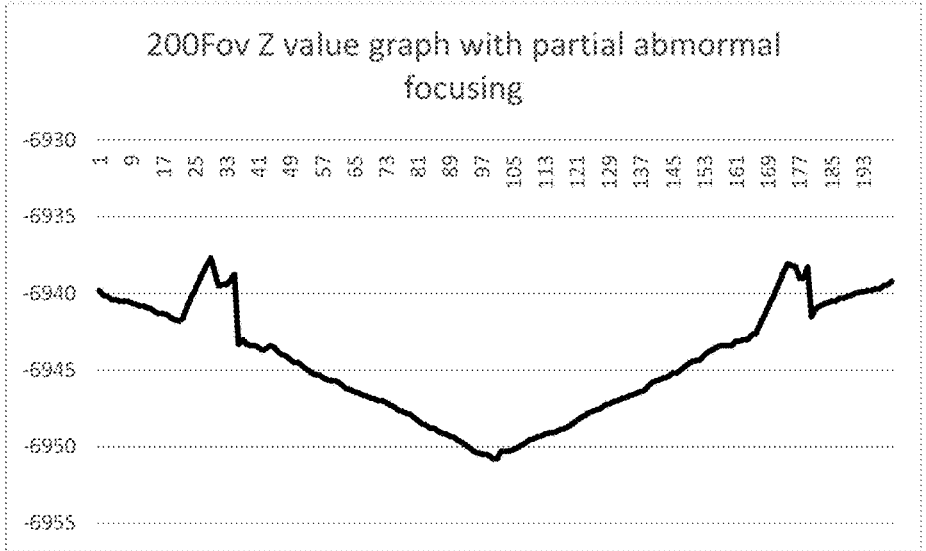
FIG. 2 is a Z value graph when focus tracking fails in abnormal convex portions FOV during sequence determination.
Figure 3:
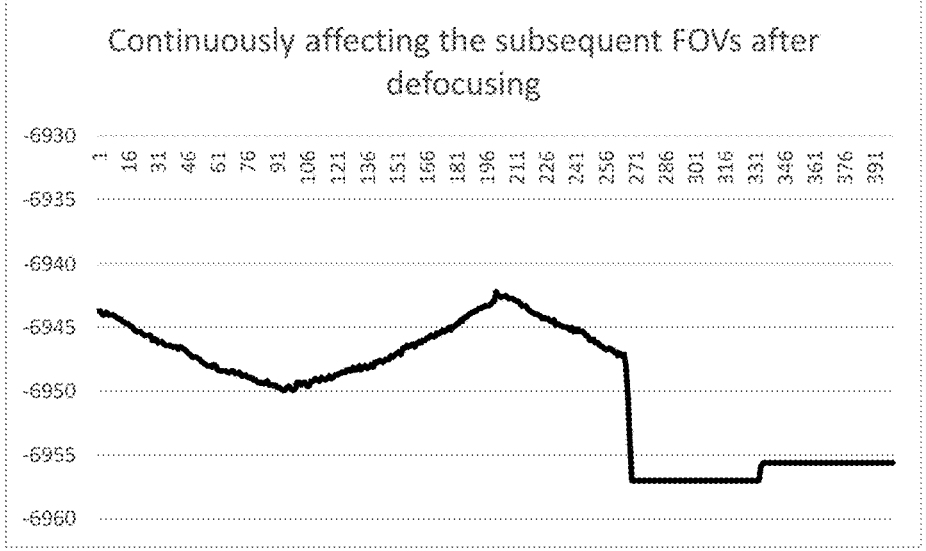
FIG. 3 is a Z value graph when focus retracking still fails at the end of cyclic photographing after focus tracking fails and interference disappears during sequence determination.
Figure 4:
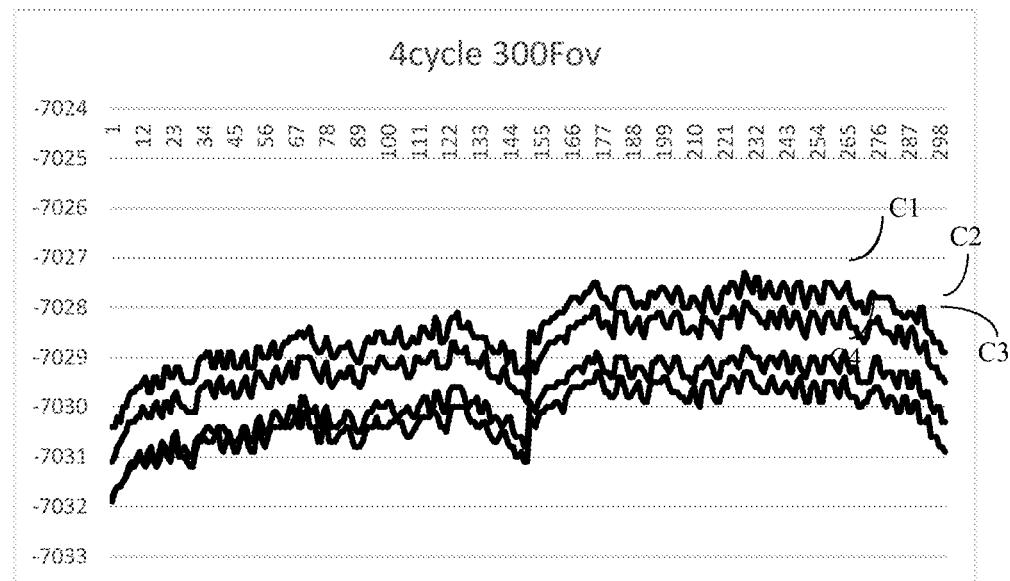
FIG. 4 is a schematic graph of different focusing positions generated from focusing data of objects during sequence determination.

The embodiments of the present disclosure are described in detail below, and the examples of the embodiments are shown in the accompanying drawings, throughout which identical or similar reference numerals represent identical or similar elements or elements having identical or similar functions. The embodiments described below by reference to the accompanying drawings are exemplary and are merely intended to explain the present disclosure rather than be construed as limiting the present disclosure.

This application claims the benefit of priority from Chinese Patent Application No. 201810814359.0 and 201810813660.X filed on Jul. 23, 2018, the entire contents of which applications are hereby incorporated by reference in this application.

In the description of the present disclosure, it should be understood that the terms "first", "second", "third", "fourth" and "fifth" are merely intended to facilitate description rather than be construed as indicating or implying relative importance or implicitly indicating the number of indicated technical features. Therefore, features defined with "first" and "second" may explicitly or implicitly include one or more of the features. In the description of the present disclosure, unless otherwise specifically defined, "a plurality of" means two or more than two.

In the description of the present disclosure, unless otherwise clearly specified and defined, "connect" should be comprehended in its broad sense. For example, "connect" may be "fixedly connect", "detachably connect" or "integrally connect"; "mechanically connect", "electrically connect" or "communicate with each other"; or "directly interconnect", "indirectly interconnect through an intermediate", "the communication between the interiors of two elements" or "the interaction between two elements". For those of ordinary skill in the art, the specific meanings of the aforementioned terms in the present disclosure can be understood according to specific conditions.

Directions or positional relationships indicated by terms such as "center", "thickness", "upper", "lower", "front", "rear", etc. are those shown based on the detailed description or the accompanying drawings, and are merely intended to facilitate and simplify description rather than indicate or imply that the indicated device or element must have a specific direction and be structured and operated according to the specific direction.

The "unchanged" involving, for example, distance, object distance and/or relative position may be expressed as "absolutely unchanged" or "relatively unchanged" in numerical value, numerical value range or quantity, and the "relatively unchanged" is "kept within a certain deviation range or a preset acceptable range". Unless otherwise stated, "unchanged" involving distance, object distance and/or relative position is "relatively unchanged".

The disclosure hereinafter provides a plurality of embodiments or examples for implementing the technical solutions of the present disclosure. The present disclosure may repeat reference numbers and/or reference letters in different examples. Such repetition is intended for simplicity and clarity rather than for indicating the relationship between various embodiments and/or settings discussed.

"Sequence determination" used in the embodiments of the present disclosure refers to nucleic acid sequence determination, including DNA sequencing and/or RNA sequencing, and/or including long fragment sequencing and/or short fragment sequencing. The "sequence determination reaction" refers to sequencing reaction.

Figure 5:
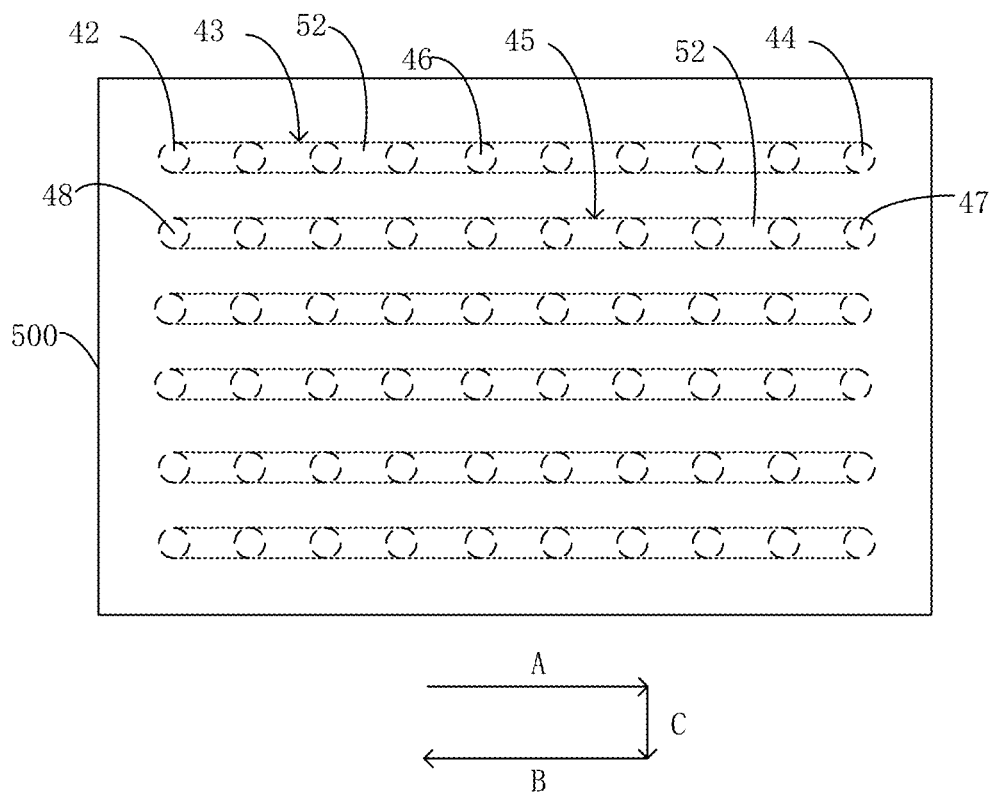
FIG. 5 is a structural schematic diagram of a first preset track and a second preset track according to one embodiment of the present disclosure.
Figure 11:
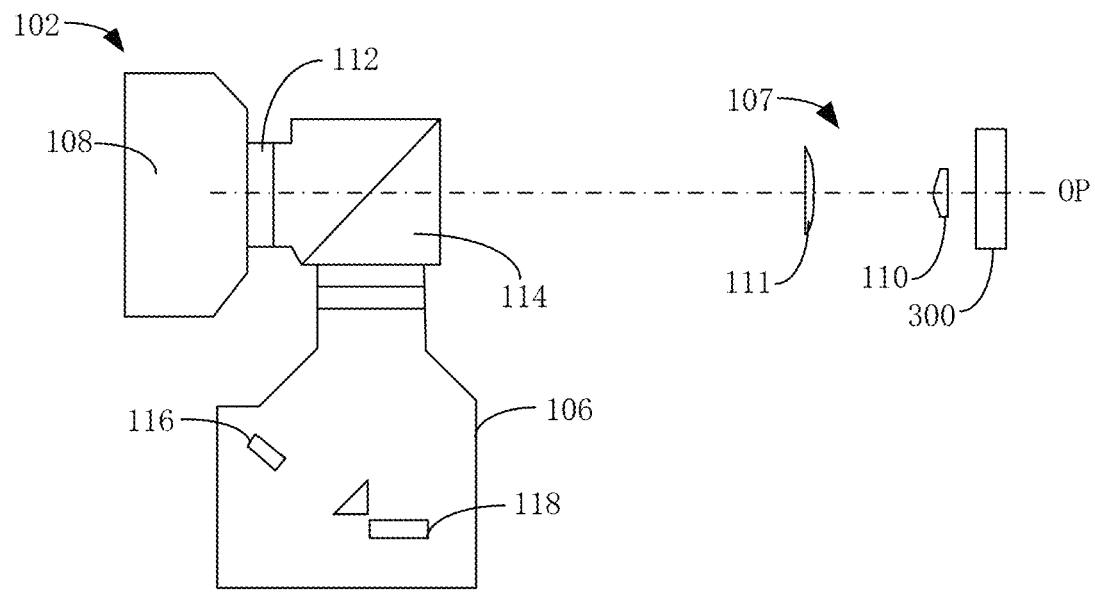
FIG. 11 is a partial structural schematic diagram of a system for imaging according to one embodiment of the present disclosure.
Figures 12, 13:
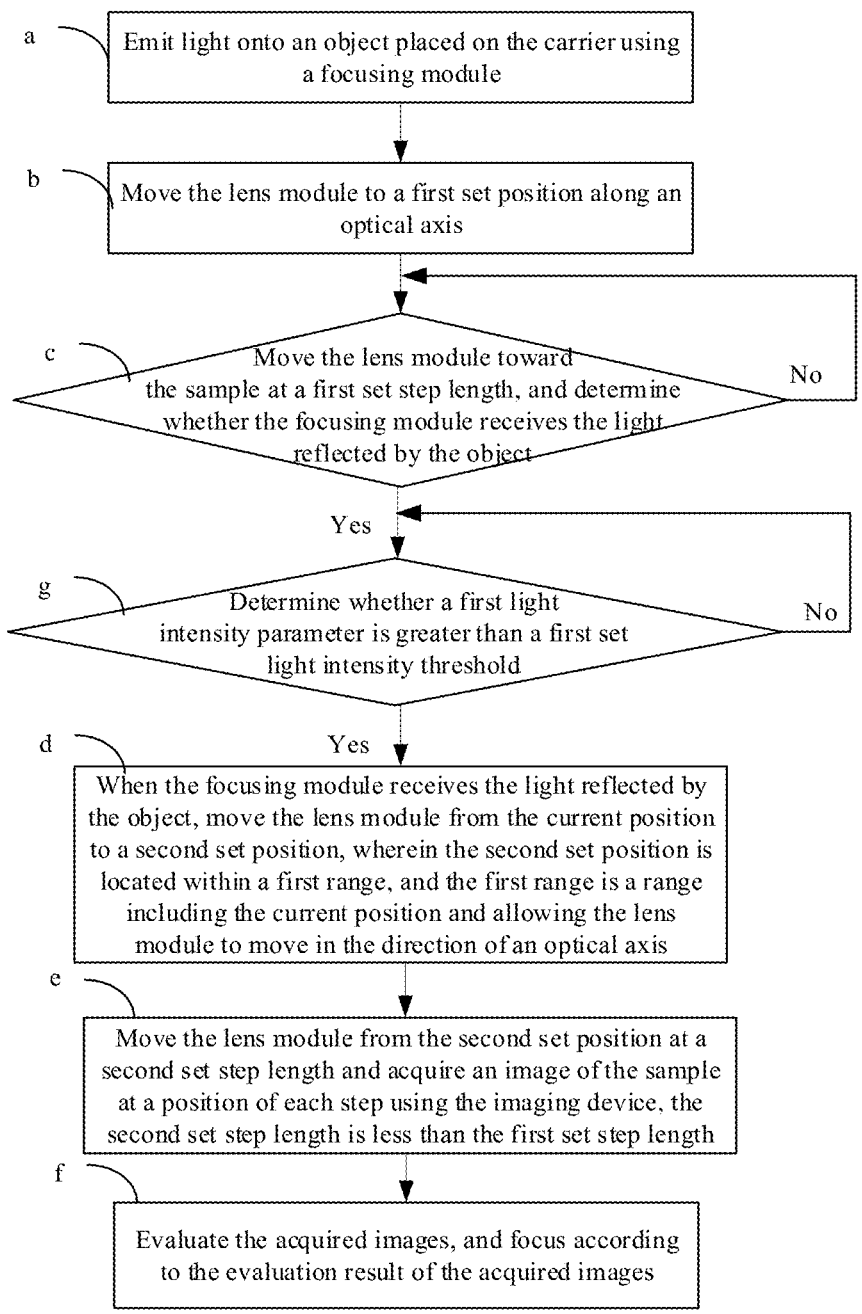
FIG. 12 is a schematic diagram of a connected component of an image according to one embodiment of the present disclosure.
FIG. 13 is another schematic flow chart of the focusing method according to one embodiment of the present disclosure.

One embodiment of the present disclosure provides a method for imaging, which images objects using a system for imaging. Referring to FIGS. 5, 11 and 12, the system for imaging comprises a lens 104. The objects comprise a first object 42, a second object 44 and a third object 46 located at different positions on a first preset track 43. The method for imaging comprises: allowing the lens 104 and the first preset track 43 to move relatively in a first predetermined relationship to acquire an image of the third object 46 using the system for imaging without focusing, wherein the first predetermined relationship is determined by a focal plane position of the first object 42 and a focal plane position of the second object 44.

In the aforementioned method for imaging, the first predetermined relationship is determined by the focusing positions of the first object 42 and the second object 44, and when other objects on the first preset track are imaged, focal planes can be directly predicted according to the first predetermined relationship to acquire a clear image of the third object without focusing. The method for imaging is particularly suitable for a scenario where there are a lot of objects and it is desired to quickly and continuously acquire images of these objects. The method is high in imaging efficiency and is able to accurately determine the focal plane positions of the subsequent objects to acquire the image information of the subsequent objects in continuous image acquisition even if the system for imaging fails to track the focus. The method used in cooperation with a focus tracking system of the system for imaging can provide a remedy in the event that the focus tracking system cannot normally track the focus again after it fails to track the focus.

Specifically, in the example of FIG. 5, the first preset track 43 may be a linear track, and the first object 42 and the second object 44 are located at two positions of the linear track, for example, at two ends of the linear track. It can be understood that there may be a plurality of third objects 46, and the plurality of third objects 46 are sequentially arranged on the first preset track 43, and are located between the first object 42 and the second object 44. It can be understood that, in other examples, the third objects 46 may be located at other positions different from the positions of the first object 42 and the second object 44. In other examples, the first preset track 43 may be a non-linear track, e.g., a curve-shaped track, which can be regarded as the fitting of a plurality of segments, and the first object, the second object and the third object are located on a same segment in the curve-shaped track.

In some embodiments, the first predetermined relationship may be a linear relationship. In one embodiment, referring to FIG. 5, when the first preset track 43 is one or more channels 52 of a flowcell 500 used in the process of sequence determination and the imaged third object 46 is one or more positions (FOVs) in the channels 52, during photographing, the lens and the first preset track 43 can move relatively in a first direction A. For example, the lens 104 is fixed and the lens 104 comprises an optical axis OP, and the first preset track 43 moves in a direction perpendicular to the optical axis OP. It can be understood that in some embodiments, the first preset track 43 can move in a direction parallel to the optical axis OP. The first preset track 43 can be moved according to the requirement of actual adjustment.

The system for imaging comprises a camera 108, the lens 104 may be mounted on the camera 108, and the camera 108 performs imaging by acquiring light passing through the lens 104.

In some embodiments, allowing the lens 104 and the first preset track 43 to move relatively comprises at least one of the following: fixing the lens 104 and moving the first preset track 43, fixing the first preset track 43 and moving the lens 104, and simultaneously moving the lens 104 and the first preset track 43.

Thus, as the lens 104 and the first preset track 43 can be moved in a variety of ways, the adaptability is high, and the application range of the method for imaging is broadened.

Specifically, when the first preset track 43 needs to be moved, the first preset track 43 can be placed on a carrier and the carrier can bring the first preset track 43 and the objects to translate back and forth in a direction perpendicular to the optical axis OP of the lens 104, so that one of the third objects 46 can be placed under the lens 104, and thereby the system for imaging can image the third object 46.

When the lens 104 needs to be moved, the lens 104 can be mounted on a driving mechanism and the driving mechanism can electrically or manually drive the lens 104 to translate back and forth in a direction perpendicular to the optical axis OP of the lens 104, so that the lens 104 can be over one of the third objects 46, and thereby the system for imaging can image the object.

Simultaneously moving the lens 104 and the first preset track 43 can be understood as first moving the lens 104 and then moving the first preset track 43 to make one of the third objects 46 be located under the lens 104; or first moving the first preset track 43 and then moving the lens 104 to make the lens 104 be located over one of the third objects 46; or moving the lens 104 and the first preset track 43 together to make the lens be located over one of the third objects 46.

In some embodiments, the determination of the first predetermined relationship comprises: focusing the first object 42 using the system for imaging to determine first coordinates; focusing the second object 44 using the system for imaging to determine second coordinates; and establishing the first predetermined relationship according to the first coordinates and the second coordinates, wherein the first coordinates represent the focal plane position of the first object 42, and the second coordinates represent the focal plane position of the second object 44. Thus, the first predetermined relationship can be determined in advance, and when imaging other objects, clear images of the other objects can be acquired using the system for imaging without focusing according to the first predetermined relationship, thus simplifying the method for imaging and increasing the efficiency of the method for imaging.

Specifically, according to one embodiment mentioned above, referring to FIG. 5, when the imaged third object 46 is one or more positions of the flowcell 500 used in sequence determination, the first object 42, the second object 44 and the third object 46 can be located in the same channel of the flowcell 500.

Preferably, the first object 42, the third object 46 and the second object 44 are sequentially arranged on the first preset track 43. According to one embodiment mentioned above, the first direction A is a direction from the left to the right of the flowcell 500, that is, the first object 42, the third object 46 and the second object 44 are sequentially arranged on the first preset track 43 in the direction A from the left to the right of the flowcell 500. In other embodiments, the first object 42, the third object 46 and the second object 44 may also be arranged on the first preset track 43 in other orders.

It can be understood that during the determination of the first predetermined relationship, two objects, the first object 42 and the second object 44, can be selected on the first preset track 43 for focusing so as to acquire the focusing positions of the two objects. Specifically, it can be known from the foregoing description that during sequence determination, the relative focal plane positions of two FOVs (particularly adjacent FOVs) on the first preset track 43 are kept unchanged. Therefore, the first predetermined relationship can be determined with the focal plane coordinate data of the first object 42 and the second object 44 acquired by focusing the first object 42 and the second object 44. By using the first predetermined relationship, any third objects on the first preset track 43 can be acquired without focusing.

Therefore, as an example, the first object 42 and the second object 44 may be a starting point FOV and an end point FOV on the first preset track (e.g., FOVs at both ends of the same row of the same channel) in a cycle (i.e., the same period of time), as shown in FIG. 5. The third object 46 may be any one or multiple FOVs between the first object 42 and the second object 44. It can be understood that based on the above law, the first object 42 and the second object 44 may also be FOVs at other positions, and the third object 46 does not need to be located between the first object 42 and the second object 44 either. It is only necessary to, based on a rule of determining a straight line (first predetermined relationship) according to two points, select any two positions (objects) on the first preset track, acquire a focal plane position corresponding to each position and acquire the first predetermined relationship corresponding to the first preset track 43 according to the focal plane positions at each position, and thereby an image of the third object can be acquired using the system for imaging through the first predetermined relationship without focusing. In a practical application scenario, a coordinate system can be established to digitize/quantify relative positional relations including the focal plane positions. For example, when image signals are acquired using a sequence determination platform, a three-dimensional coordinate system can be established with x and y representing the planes where the first preset track and a second preset track locate and z representing the direction of the optical axis of an objective, and the focal plane position at each position comprises a Z value for a focal plane.

It should be noted that the mentioned cycle represents the influence of time factor/image acquisition cycle. Generally, in a high-precision system for imaging, such as a microscopic system with a 60× objective and a depth of field of 200 nm, the fluctuation caused by one or more back-and-forth mechanical movements of the first/second preset track or one or more back-and-forth mechanical movements of a platform bearing the first/second preset track may exceed the depth of field. Therefore, preferably, when using the method for imaging according to any of the aforementioned or undermentioned embodiments to continuously image a plurality of objects multiple times at high precision, if the plurality of objects located on the same preset track are not in the same image acquisition time cycle (e.g., in different mechanical movement directions), a first predetermined relationship that is established by re-fitting based on focusing data after refocusing is relatively more accurate and better. It can be understood by those skilled in the art that when continuously imaging a plurality of objects at relatively low precision, due to a large depth of field, the focal plane position deviation caused by mechanical reciprocation may not be considered. That is, for the plurality of objects on the same preset track, the first and/or second predetermined relationships determined in any previous image acquisition cycle can be used for imaging in different image acquisition cycles.

Figure 7:
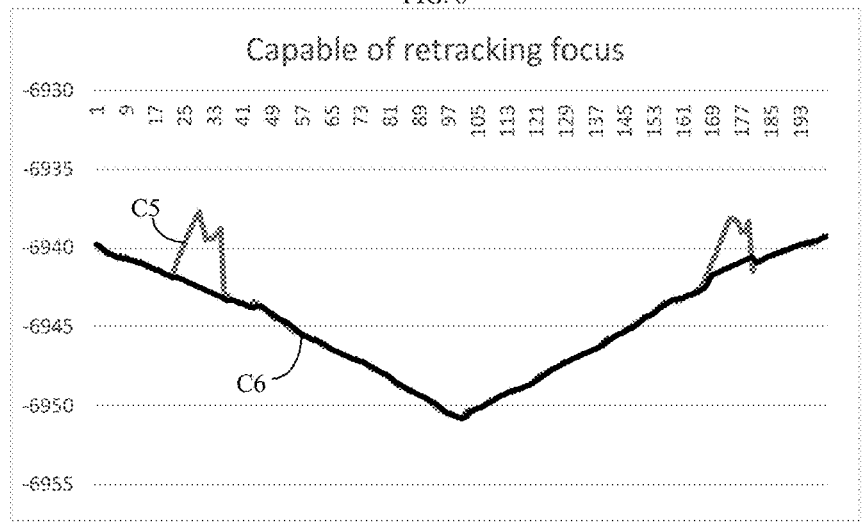
FIG. 7 is a schematic graph of focusing positions generated from focusing data of the objects when focus retracking succeeds in the presence of interference during sequence determination.
Figure 8:
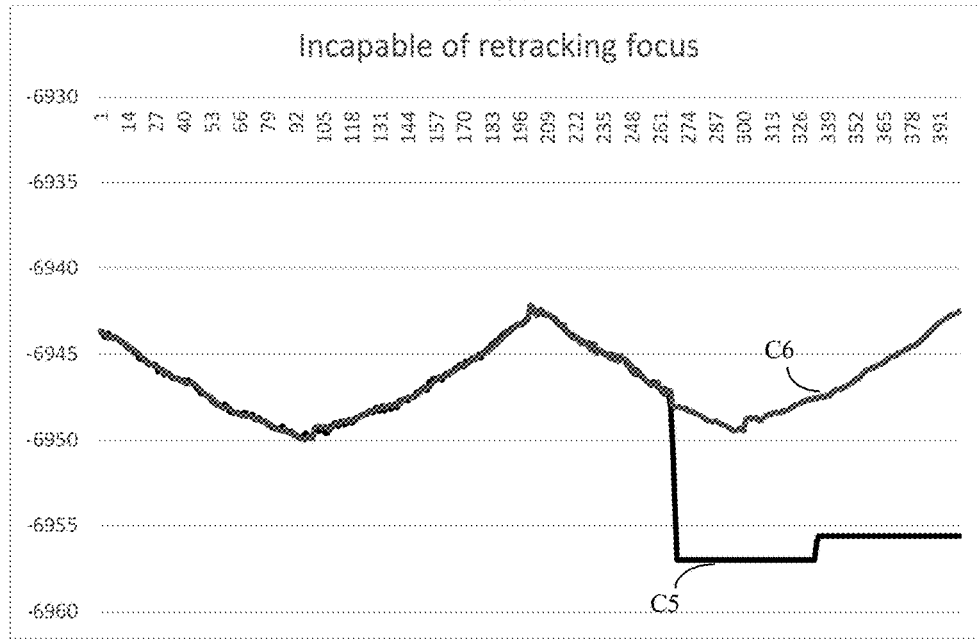
FIG. 8 is a schematic graph of focusing positions generated from focusing data of the objects when focus retracking fails in the presence of interference during sequence determination.
Figure 9:
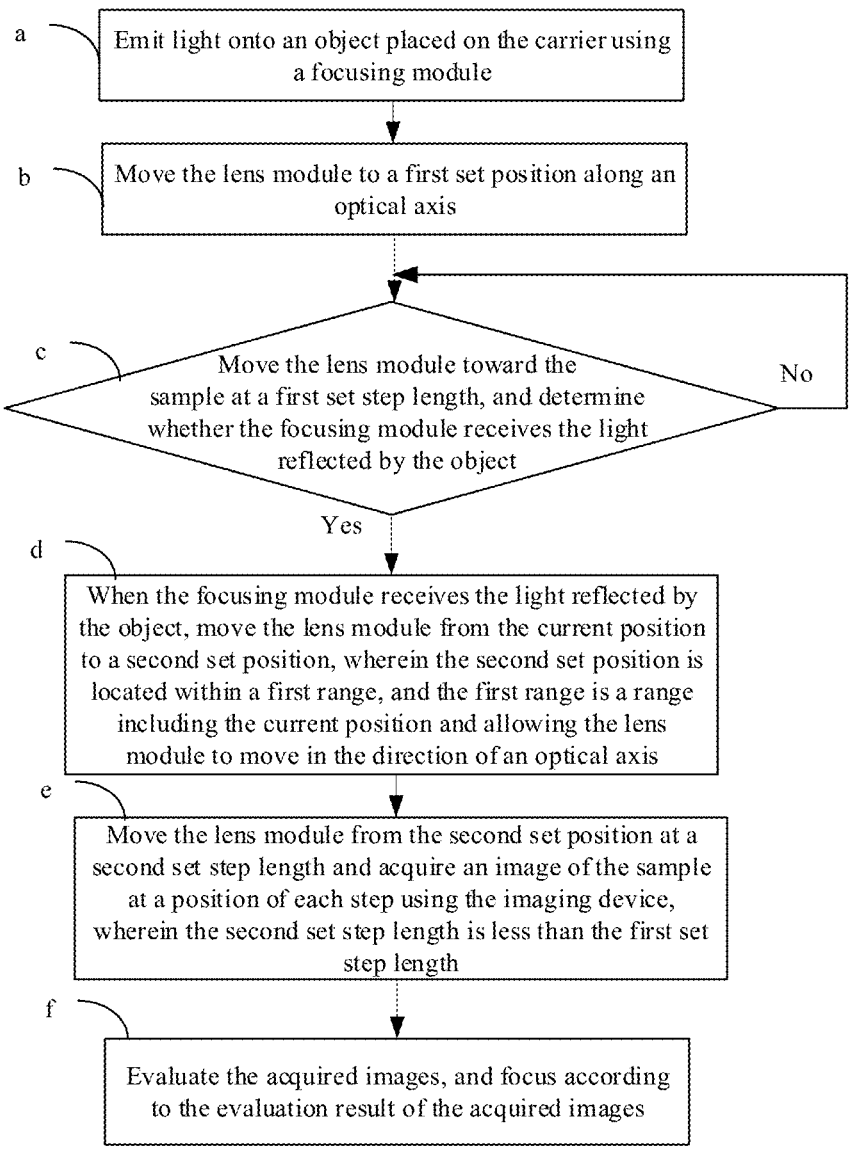
FIG. 9 is a schematic flow chart of a focusing method according to one embodiment of the present disclosure.

Predicted results of Z value after the aforementioned prediction strategy is employed are shown as FIGS. 7-9.

Figure 6:
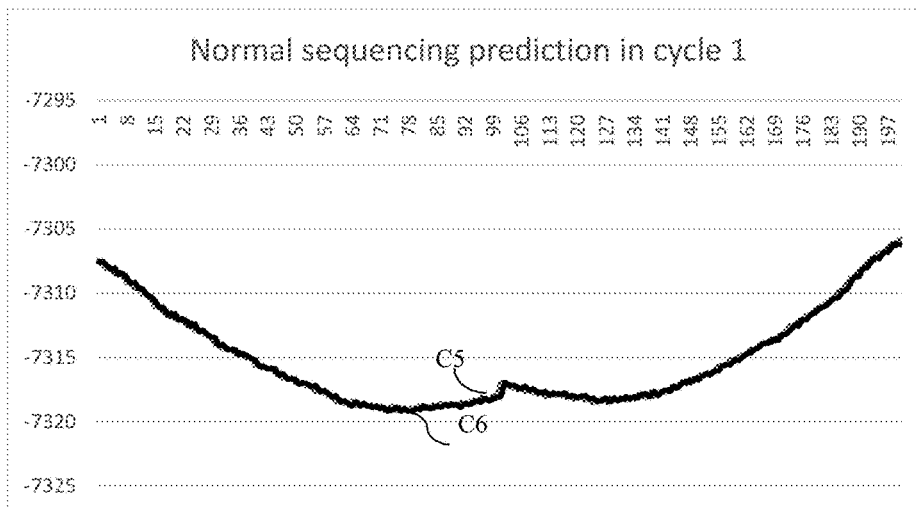
FIG. 6 is a schematic graph of focusing positions generated from focusing data of the objects in the absence of interference during sequence determination.

The C5 curves in FIGS. 6-8 are Z value curves (focal plane lines formed by actual focusing positions) acquired from real photographing of the camera in which only camera focus tracking is used. The C6 curves are predicted Z value curves (focal plane lines formed by predicted focusing positions).

FIG. 6 shows the prediction of Z values of a plurality of FOVs in a cycle in the absence of interference, and FIG. 7 and FIG. 8 show the prediction of Z values in the presence of interference and defocusing. Without intervention, focus retracking succeeds after defocusing in FIG. 7, while focus retracking fails after defocusing in FIG. 8.

In some embodiments, the objects comprise a fourth object 47 and a fifth object 48 located at different positions on the second preset track 45. The method for imaging comprises: allowing the lens 104 and the second preset track 45 to move relatively in a second predetermined relationship to acquire an image of the fifth object 48 using the system for imaging without focusing, wherein the second predetermined relationship is determined by a focal plane position of the fourth object 47 and the first predetermined relationship, and the second preset track 45 is different from the first preset track 43. Based on the first predetermined relationship of the first preset track 43 and the focal plane position of any object on the second preset track 45, the second predetermined relationship corresponding to the second preset track 45 is determined. A clear image of any object on the second preset track 45 can be acquired using the second predetermined relationship without focusing, and thus, clear images of more objects can be acquired, satisfying the demand of users.

Specifically, the second preset track 45 may be a track adjacent to the first preset track 43. In the aforementioned embodiment, the second preset track 45 is a parallel channel adjacent to the first preset track 43. The second preset track 45 may be a linear track, and the fourth object 47 and the fifth object 48 are located at two positions of the linear track. For example, the fourth object 47 is located at one end of the linear track, and the fifth object 48 is located in the middle of the linear track. It can be understood that there may be a plurality of fifth objects 48, and the plurality of fifth objects 48 are sequentially arranged on the second preset track 45 and the fifth objects 48 are located at positions different from that of the fourth object 47. It can be understood that in other examples, the second preset track 45 may be a non-linear track, e.g., a curve-shaped track, which can be regarded as the fitting of a plurality of segments, and the fourth object 47 and the fifth object 48 are located on a same segment in the curve-shaped track.

In some embodiments, the second predetermined relationship may be a linear relationship.

In one embodiment, referring to FIG. 5, when the second preset track 45 is one or more channels 52 of the flowcell 500 used in the process of sequence determination and the imaged fifth object 48 is one or more positions (FOVs) in the channels 52, during photographing, the lens and the second preset track can move relatively in a second direction B. For example, the lens is fixed and comprises an optical axis, and the second preset track 45 can move in a direction perpendicular to the optical axis. It can be understood that in some embodiments, the second preset track 45 can move in a direction parallel to the optical axis OP. The second preset track 45 can be moved according to the requirement of actual adjustment.

It can be understood that for other ways of allowing the lens 104 and the second preset track 45 to move relatively, the aforementioned explanation of the ways of allowing the lens 104 and the first preset track 43 to move relatively can also be referred to. Therefore, there will be no detailed description herein to avoid redundancy. It should be noted that in the example of FIG. 5, the first preset track 43 and the second preset track 45 are two adjacent channels 52 on the flowcell 500, so the first preset track 43 and the second preset track 45 can move synchronously when the flowcell 500 is moved.

In some embodiments, the determination of the second predetermined relationship comprises: focusing the fourth object 47 using the system for imaging to determine fourth coordinates; and establishing the second predetermined relationship according to the first predetermined relationship and the fourth coordinates, wherein the fourth coordinates represent the focal plane position of the fourth object 47. Thus, the second predetermined relationship can be determined in advance, and when imaging other objects, clear images of the other objects can be acquired using the system for imaging without focusing according to the second predetermined relationship, thus simplifying the method for imaging and increasing the efficiency of the method for imaging.

Specifically, according to one embodiment mentioned above, referring to FIG. 5, when the imaged fifth object 48 is one or more positions of the flowcell 500 used in sequence determination, the fourth object 47 and a plurality of fifth objects 48 can be located in the same channel of the flowcell 500.

Preferably, the fourth object 47 and the plurality of fifth objects 48 are sequentially arranged on the second preset track 45. According to one embodiment mentioned above, the second direction B is a direction from the right to the left of the flowcell 500, that is, the fourth object 47 and the plurality of fifth objects 48 are sequentially arranged on the second preset track 45 in the direction B from the right to the left of the flowcell 500. In other embodiments, the fourth object 47 and the fifth objects 48 may also be arranged on the second preset track 45 in other orders.

It can be understood that for the determination of the second predetermined relationship, the aforementioned explanation of the determination of the first predetermined relationship can be referred to. Therefore, there will be no detailed description herein to avoid redundancy.

In some embodiments, the method for imaging comprises: allowing, after acquiring the image of the third object 46, the lens 104 and the first preset track 43 and/or the second preset track 45 to move relatively to acquire an image of the fifth object 48 using the system for imaging without focusing. Thus, after the image of the third object 46 on the first preset track 43 is acquired, the image of the fifth object 48 on the second preset track 45 can be acquired, and thereby, the imaging of objects on different preset tracks can be realized.

Specifically, in the aforementioned embodiment, after the images of one or more third objects 46 on the first preset track 43 are acquired, the lens 104 and the flowcell 500 are moved relatively in a third direction C (i.e., a direction perpendicular to the extending direction of the channel 52), so that the lens 104 is located over the fifth object 48, and the image of the fifth object 48 is then acquired using the system for imaging without focusing according to the second predetermined relationship. In the illustrated embodiment, the third direction C is perpendicular to the first direction A and the second direction B.

Further, in the example shown in FIG. 5, the first preset tracks 43 and the second preset tracks 45 are alternately arranged at intervals from top to bottom. After the images of one or more third objects 46 on the uppermost first preset track 43 are acquired, the lens 104 and the flowcell 500 are moved relatively, so that the lens 104 is located over the fifth objects 48 on the first second preset track 45, and images of one or more fifth objects 48 on the first second preset track 45 are then acquired. Then the lens 104 and the flowcell 500 are moved relatively, so that the lens 104 is located over the third object 46 on the second first preset track 43 and an image of the third object 46 on the second first preset track 43 is then acquired, until clear images of the objects on all the first preset tracks 43 and the second preset tracks 45 are acquired.

To sum up, since the focal plane position (e.g., Z value) of the object to be imaged is predicted according to the first predetermined relationship or the second predetermined relationship, other FOVs can be imaged without focusing, which increases the imaging efficiency and accuracy. Further, when applied in the process of photographing the same region and similar regions, this determination method can quickly and continuously acquire images of a plurality of objects. The focusing process can also be omitted in the process of continuous photographing so as to realize fast scanning photographing. Further, in cooperation with the automatic focus tracking system of the camera, the focal plane prediction technology adopted can achieve better image quality, and can solve the problem that the camera cannot retrack the focus in the event of interference and defocusing. In a broader sense, the camera can have certain intelligence when using the focal plane prediction technology, which enables quick focusing and even the omission of focusing by assisting the focusing according to prior knowledge. Particularly in the process of photographing, such intelligence has more important extended application.

In some embodiments, the system for imaging comprises a device for imaging 102 and a carrier. The device for imaging 102 comprises a lens 104 and a focusing module 106. The lens 104 comprises an optical axis OP, and the lens 104 can move along the direction of the optical axis OP. A first preset track 43 and/or a second preset track 45 are located on the carrier.

The focusing process for the determination of a first predetermined relationship or a second predetermined relationship in the present disclosure will be illustrated with specific embodiments below. It should be noted that, unless otherwise specified, the elements with the same name used in different embodiments should be limited to the explanation of the respective embodiments, and the elements with the same name in different embodiments should not be cross-understood or confused.

Embodiment 1

Figure 10:
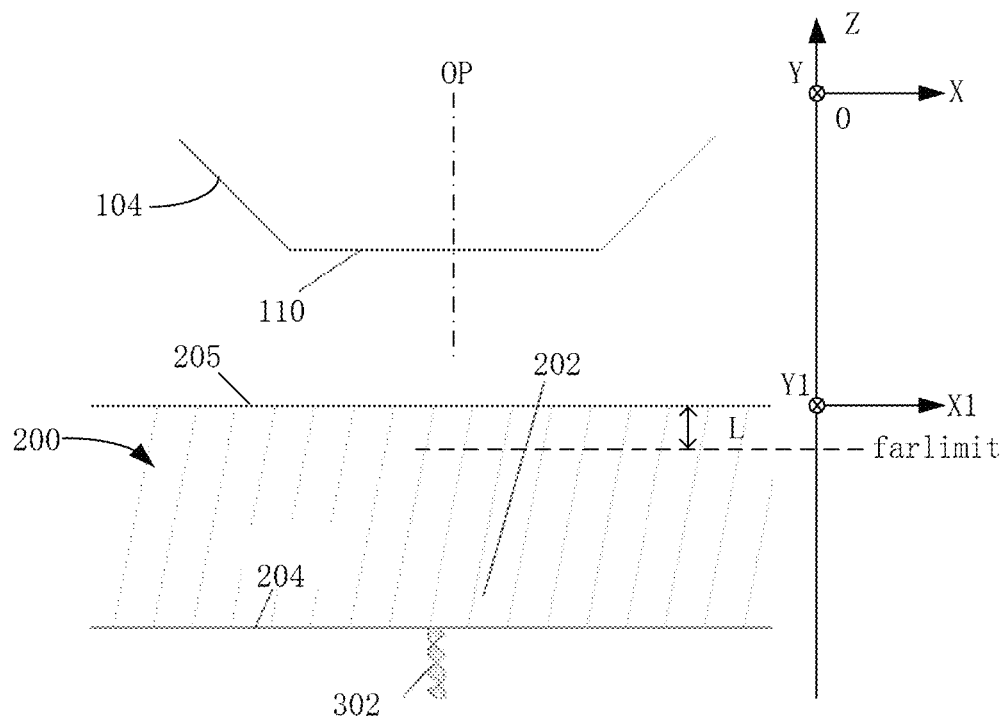
FIG. 10 is a schematic diagram of a positional relationship between a lens and an object according to one embodiment of the present disclosure.

Referring to FIGS. 9-11, focusing comprises: (a) emitting light onto an object using a focusing module; (b) moving a lens to a first set position; (c) moving the lens from the first set position toward the object at a first set step length, and determining whether the focusing module receives the light reflected by the object; (d) when the focusing module receives the light reflected by the object, moving the lens from the current position to a second set position, wherein the second set position is located within a first range which is a range including the first set position and allowing the lens to move in the direction of an optical axis; (e) moving the lens from the second set position at a second set step length, and acquiring an image of the object at a position of each step using a device for imaging, wherein the second set step length is less than the first set step length; and (f) evaluating the images of the object to abtain an image evaluation result and focusing according to the image evaluation result.

By using the aforementioned method for imaging, a plane for clear imaging of a target object, i.e., a clear plane/clear surface, can be quickly and accurately found. The method is particularly suitable for a device comprising a precision optical system and having difficulty in finding a clear plane, such as an optical detection device with a high-magnification lens. Thus, cost can be reduced.

Specifically, in the aforementioned focusing step, the object is an object whose focal plane position needs to be acquired. For example, if a first predetermined relationship needs to be determined, two objects can be selected on a first preset track, and focusing is successively or simultaneously performed on the two objects on the first preset track 43 to acquire two sets of focal plane position data, wherein one set of focal plane position data serves as the focal plane position data of the first object 42 and the other serves as the focal plane position data of the second object 44; and if a second predetermined relationship needs to be determined, an object can be selected on a second preset track for focusing to acquire the focal plane position data of the object, which serves as the focal plane position data of a fourth object 47, so that the second predetermined relationship can be determined with reference to the first predetermined relationship.

Referring to FIG. 10 and FIG. 11, in the embodiment of the present disclosure, objects are a plurality of positions (Field of Views, FOVs) of a sample 300 applied in sequence determination. Specifically, when the first predetermined relationship needs to be determined, the object for focusing may serve as a first object or a second object; and when the second predetermined relationship needs to be determined, the object for focusing may serve as a fourth object or a fifth object. The sample 300 comprises a carrying device 200 and a test sample 302 located on the carrying device. The test sample 302 is a biomolecule, such as a nucleic acid. The lens 104 is over the carrying device 200. The carrying device 200 is provided with a front panel 202 and a back panel (lower panel), each of which is provided with two surfaces, and the test sample 302 is connected to the upper surface of the lower panel, that is, the test sample 302 is located under the lower surface 204 of the front panel 202. In an embodiment of the present disclosure, because the device for imaging 102 acquires an image of the test sample 302, the test sample 302 is the corresponding position (FOV) during photographing. The test sample 302 is located under the lower surface 204 of the front panel 202 of the carrying device 200, and when a focusing process begins, the lens 104 moves in order to find a medium interface 204 where the test sample 302 is located so as to increase success rate of the device for imaging 102 in acquiring a clear image. In an embodiment of the present disclosure, the test sample 302 is a solution, the front panel 202 of the carrying device 200 is glass, and the medium interface 204 between the carrying device 200 and the test sample 302 is the lower surface 204 of the front panel 202 of the carrying device 200, i.e., the interface between two media (glass and liquid). The test sample 302 from which the device for imaging 102 needs to acquire an image is located under the lower surface 204 of the front panel 202, and at this time, a clear surface for the clear imaging of the test sample 302 is determined and found by the image acquired by the device for imaging 102. This process can be referred to as focusing. In one example, the thickness of the front panel 202 is 0.175 mm.

In other embodiments, the carrying device 200 may be a slide, and the test sample 302 is placed on the slide or the test sample 302 is clamped between two slides. In another embodiment, the carrying device 200 may be a reaction device, e.g., a flowcell with an upper carrying panel and a lower carrying panel similar to a sandwich structure, and the test sample 302 is arranged on the flowcell.

In the present embodiment, referring to FIG. 11, the device for imaging 102 comprises a microscope 107 and a camera 108, the lens 104 comprises a microscope objective 110 and a camera lens 112, and the focusing module 106 can be fixed with the camera lens 112 through a dichroic beam splitter 114 which is located between the camera lens 112 and the objective 110. The dichroic beam splitter 114 comprises a dual c-mount splitter. The dichroic beam splitter 114 can reflect the light emitted by the focusing module 106 to the objective 110 and enable visible light to pass through the objective and get into the camera 108 via the camera lens 112, as shown in FIG. 11.

In an embodiment of the present disclosure, the lens 104 moves along the optical axis OP. The movement of the lens 104 may refer to the movement of the objective 110, and the position of the lens 104 may refer to the position of the objective 110. In other embodiments, other lenses of the lens 104 can be chosen to move to realize focusing. In addition, the microscope 107 further comprises a tube lens 111 located between the objective 110 and the camera 108.

In the present embodiment, the carrier can drive a sample 200 to move on a plane (e.g., an XY plane) perpendicular to the direction of the optical axis OP (e.g., the Z axis) of the lens 104 and/or drive the sample 300 to move in the direction of the optical axis OP (e.g., the Z axis) of the lens 104.

In other embodiments, the plane on which the sample 300 is driven by the carrier to move is not perpendicular to the optical axis OP, that is, the included angle between the movement plane of the sample and the XY plane is not 0, but the method for imaging is still applicable.

In addition, the device for imaging 102 can also drive the objective 110 to move in the direction of the optical axis OP of the lens 104 for focusing. In some embodiments, the device for imaging 102 drives the objective 110 to move using a driving part such as a step motor or a voice coil motor.

In the present embodiment, when a coordinate system is established, as shown in FIG. 10, the positions of the objective 110, the carrier and the sample 300 can be provided on the negative axis of the Z axis, and the first set position can be a coordinate position on the negative axis of the Z axis. It can be understood that in other embodiments, the relationship between the coordinate system and the camera and the relationship between the coordinate system and the objective 110 can also be adjusted according to actual condition, which is not specifically limited herein.

In one example, the device for imaging 102 comprises a total internal reflection fluorescent microscope, the magnification of the objective 110 is 60×, and the first set step length S1 is equal to 0.01 mm. Thus, the first set step length S1 is suitable, because a too large first set step length S1 will exceed an acceptable focusing range and a too small first set step length S1 will increase time consumption.

When the focusing module 106 does not receive the light reflected by the object, the lens 104 continues to move toward the sample 300 and the object at the first set step length.

In the present embodiment, the system for imaging can be applied to a sequence determination system, that is, the sequence determination system comprises the system for imaging.

In the present embodiment, with the current position as a reference, the first range comprises a first interval and a second interval opposite to each other, the second interval is defined closer to the sample, and step (e) comprises: (i) when the second set position is located within the second interval, moving the lens from the second set position toward a direction away from the object, and acquiring an image of the object at a position of each step using the device for imaging; or (ii) when the second set position is located within the first interval, moving the lens from the second set position toward a direction close to the object, and acquiring an image of the object at the position of each step using the device for imaging. Thus, the movement of the lens can be controlled according to the specific position of the second set position, so that the desired image can be quickly acquired.

Specifically, in one example, a coordinate axis Z1 can be established in the direction of the optical axis of the lens with the current position as an origin oPos, the first interval is a positive interval, and the second interval is a negative interval. The range of the positive and negative intervals is ±rLen, that is, the first range is [oPos+rLen, oPos−rLen]. The second set position is located within the negative interval and is (oPos−3×r0). r0 represents the second set step length. The device for imaging starts to perform image acquisition at (oPos−3×r0), and moves toward a direction away from the object.

It should be noted that the coordinate axis Z1 established in the aforementioned example is superposed with the Z axis in FIG. 10, and the first range is located within the negative interval of the Z axis. Thus, the control of the method for imaging can be simplified. For example, as long as the positional relationship between the origin of the Z axis and the origin oPos, the corresponding relationship between the position of the lens on the coordinate axis Z1 and the position of the lens on the Z axis can be known.

In the present embodiment, step (f) comprises: comparing image evaluation result with a preset condition, and if the image evaluation result meets the preset condition, saving the position of the lens 104 corresponding to the image; if the image evaluation result does not meet the preset condition, moving the lens 104 to a third set position, wherein the third set position is located within another interval of the first range different from the interval where the second set position is located, i.e., starting focusing for reverse photographing. For example, in the process of performing part (i) of step (e), none of the image evaluation result meets the preset condition, and then the lens 104 is moved to the third set position, namely moving the lens to the initial position of performing part (ii) of step (e), and the focusing for reverse photographing, i.e., the process of performing part (ii) of step (e), is performed. Thus, searching a focusing position for an image in the first range effectively increases the efficiency of the method for imaging.

Specifically, referring to the example of the aforementioned embodiment, the second set position is located within (oPos−3×r0) of the negative interval, the lens is moved upward from the second set position, and the device for imaging 102 acquires image at the position of each step; if image evaluation result does not meet the preset condition, then the lens 104 is moved to the third set position (e.g., (oPos+3×r0)) located within the positive interval; the device for imaging 102 then starts to acquire image from (oPos+3*r0) and moves toward a direction close to the object, and according to the image evaluation result, focusing is realized. When the image evaluation result meets the preset condition, the current position of the lens 104 corresponding to the image is saved as a saved position, which enable the device for imaging 102 to output a clear image when photographing in a sequence determination reaction.

In some embodiments, the image evaluation result comprises a first evaluation value and a second evaluation value, the second set step length comprises a rough step length and a fine step length, and step (f) comprises: moving the lens at the rough step length until the first evaluation value of the image at the corresponding position is not greater than a first threshold, moving the lens 104 at the fine step length until the second evaluation value of the image at the corresponding position is maximal, and saving the position of the lens 104 corresponding to the image when the second evaluation value is maximal Thus, the rough step length can make the lens 104 get close to the focusing position quickly, and the fine step length can ensure that the lens 104 can reach the focusing position.

Specifically, the position of the lens 104 corresponding to the image with the maximal second evaluation value can be saved as a focusing position. When the device for imaging 102 is used to acquire an image at the position of each step, a first evaluation value and a second evaluation value are calculated for the acquired image.

In one example, in the process of sequence determination, the object is provided with an optically detectable label, such as a fluorescent label, and fluorescent molecules can be excited to emit fluorescence under the laser irradiation with a specific wavelength. The image acquired by the device for imaging 102 comprises spots that may correspond to the positions of the fluorescent molecules. It can be understood that when the lens 104 is located at a focusing position, the spots corresponding to the positions of the fluorescent molecules in the acquired image are smaller and brighter; when the lens 104 is located at a non-focusing position, the spots corresponding to the positions of the fluorescent molecules in the acquired image are larger and less bright.

In the present embodiment, the image is evaluated by the size and intensity of the spots on the image.

For example, the first evaluation value is used to represent the size of the spot of the image. In one example, the first evaluation value is determined by calculating sizes of connected components corresponding to the spots of the image, and pixels connectivity greater than the average pixel value of the image is defined as a connected component. The first evaluation value can be determined, for example, by calculating the size of the corresponding connected component of each spot, and the average value of the sizes of the connected components corresponding to the spots is taken to represent a characteristic of the image as the first evaluation value of the image. For another example, the sizes of the connected components corresponding to the spots can be ranked from the smallest size to the largest size, and the size of the connected component at the 50th, 60th, 70th, 80th or 90th quantile is taken as the first evaluation value of the image.

In one example, the size Area of a connected component corresponding to a spot of the image is equal to A×B with A representing the size of the connected component in row centered on the center of the matrix corresponding to the spot and B representing the size of the connected component in column centered on the center of the matrix corresponding to the spot. The matrix corresponding to the spot is defined as a matrix k1×k2 composed of odd rows and odd columns, which contains k1×k2 pixels.

In one example, the image is binarized firstly, and then the image is converted into a digital matrix for calculating the size of connected components. For example, with the average pixel value of the image as a reference, pixels not less than the average pixel value are marked as 1, and pixels less than the average pixel value are marked as 0, as shown in FIG. 12. In FIG. 12, the center of the matrix corresponding to the spot is shown in bold and enlarged, and a thick frame represents a 3×3 matrix. The connected pixels marked as 1 form a connected component, and the size of the connected component corresponding to the spot is A×B, wherein A×B=3×6.

The first threshold may be set according to experience or prior data. In one example, the first evaluation value represents the size of the spots on the image. It is observed that the connected component Area firstly became smaller and then larger in the process of getting close to a clear surface and getting away from the clear surface. The first threshold is determined based on the numerical value and change rule of Area in the focusing process where the clear surface is found multiple times. In one example, the first threshold is set as 260. It should be noted that the first threshold can be related to the setting of the rough step length and the fine step length: the numerical value of the first threshold cannot be such a value that the focal plane for the imaging of the object by the device for imaging is passed in only one rough step length.

In some embodiments, the second evaluation value or the third evaluation value is determined by calculating scores of the spots of the image, and the score of the spot of one image is equal to $((k1 \times k2-1)CV-EV)/((CV+EV)/(k1 \times k2))$, wherein CV represents the central pixel value of the matrix corresponding to the spot, and EV represents the sum of the non-central pixel values of the matrix corresponding to the spot. Thus, the second evaluation value or the third evaluation value can be determined.

Specifically, after the spots of the image are determined, the Score values of all the spots of the image can be ranked in an ascending order. When the number of the spots is greater than a preset number, for example, the preset number is 30 and the number of the spots is 50, the second evaluation value may be a Score value at the 50th, 60th, 70th, 80th or 90th quantile, and thus, the interference of 50%, 60%, 70%, 80% or 90% of the spots with relatively poor quality can be eliminated Generally, it is considered that the intensity/pixel value difference between the center and edge is great and that the converged spots are spots corresponding to the molecules to be detected. The molecules to be detected may represent nucleic acid molecules which correspond to target detected objects during nucleic acid detection.

When the number of the spots is less than the preset number, for example, the number of the spots is 10 and less than the preset number, the number of spots is such small that it is not statistically significant. Therefore, the spot with the largest Score value is taken to represent the image, that is, a 100th quantile Score value is taken as the third evaluation value.

In the present embodiment, the image evaluation result comprises a first evaluation value, a second evaluation value, and a third evaluation value, and the image comprises a plurality of pixels; the preset condition is: the number of spots on the image is greater than a preset value, the first evaluation value of the image at a corresponding position is not greater than the first threshold, and the second evaluation value of the image at the corresponding position is maximal among the second evaluation values of N images before and after the image at the corresponding position; or the preset condition is: the number of spots on the image is less than the preset value, the first evaluation value of the image at the corresponding position is not greater than the first threshold, and the third evaluation value of the image at the corresponding position is maximal among the third evaluation values of N images before and after the current image. Thus, by evaluating with different evaluation values according to the number of the spots of the image, the focusing of the method for imaging is more accurate.

Specifically, in one example, the first evaluation value may be the size of a connected component corresponding to a spot of the image in the aforementioned embodiment. The second evaluation value and the third evaluation value are different Score quantiles taken according to whether the number of spots is statistically significant or not in different examples. For example, the second evaluation value and the third evaluation value may be respectively a non-100th quantile Score value and a 100th quantile Score value.

In one example, single-molecule sequencing is performed, and the spots on the acquired image may come from one or several optically detectable labeled molecules carried by test samples or from other interference.

In the present embodiment, the spots are detected, that is, the spots corresponding to/coming from the labeled molecules are detected. For example, the spots can be detected using a k1×k2 matrix. Specifically, the following method is used to detect the spots on the image:

using k1×k2 matrices to detect the spots on the image, comprising determining that the matrix in which a central pixel value of the matrix is not less than any non-central pixel value of the matrix corresponds to a spot, wherein both k1 and k2 are odd numbers greater than 1, and the k1×k2 matrix comprises k1×k2 pixels.

Based on the difference between brightness/intensity of signals generated by fluorescence and background brightness/intensity, the method can simply and quickly detect information coming from labeled molecule signals. In some embodiments, the central pixel value of the matrix is greater than a first preset value, and any non-central pixel value of the matrix is greater than a second preset value.

The first preset value and the second preset value may be set according to experience or pixel/intensity data of normal spots of a certain number of normal images. The "normal image" and "normal spot" may be an image acquired by the system for imaging at a position of clear surface and looks normal to the naked eyes, for example, the image looks clear with clean background, uniform spot size and brightness, etc. In one embodiment, the first preset value and the second preset value are related to the average pixel value of the image. For example, the first preset value is set as 1.4 times the average pixel value of the image, the second preset value is set as 1.1 times the average pixel value of the image, and therefore interference can be eliminated and a spot detection result can be acquired from labels.

Specifically, in one example, the image is a color image having three pixel values for each pixel and the color image may be converted into a grayscale image before image detection, so as to reduce the calculation and complexity in an image detection process. A non-grayscale image may be converted into a grayscale image with methods including but not limited to floating point algorithm, integer method, shift method, mean value method. Certainly, the color image may also be directly detected, the comparison of the aforementioned pixel values may be regarded as the comparison of three-dimensional values or arrays with three elements, and the relative values of a plurality of multi-dimensional values can be customized according to experience and need. For example, when any two-dimensional numerical values in a three-dimensional value a are greater than the corresponding-dimensional numerical values in a three-dimensional value b, it can be considered that the a is greater than the b.

In another example, the image is a grayscale image, the pixel value of which is a grayscale value. Therefore, the average pixel value of the image is average grayscale value of the image.

In one example, the first threshold is 260, the preset number is 30, and N is equal to 2. That is, when the first evaluation value of an image at a corresponding position is not greater than 260 and the number of spots is greater than 30, the second evaluation value of the image at the corresponding position is statistically acquired, the position of the image with the maximal second evaluation value is determined as the position of a clear surface, and two positions meeting the following condition exist before and after the position: the second evaluation value of the corresponding image is greater than zero. When the first evaluation value of an image at a corresponding position is not greater than 260 and the number of spots is less than 30, the third evaluation value of the image at the corresponding position is statistically acquired, the position of the image with the maximal third evaluation value is determined as the position of a clear surface, and two positions meeting the following condition exist before and after the position: the third evaluation value of the corresponding image is greater than zero.

If no image meeting the aforementioned condition is found, it is determined that the image evaluation result does not meet the preset condition.

In one example, k1=k2=3, then there are nine pixels in a 3×3 matrix, and EV is the sum of eight non-central pixel values.

In the present embodiment, if focusing cannot be realized according to the image evaluation result, the lens is moved to the next image acquisition region (FOV) in a direction perpendicular to the optical axis for focusing. Thus, refocusing can be performed from other objects, avoiding constant focusing on the current object on which focusing fails, thus saving time.

In the present embodiment, the method for imaging further comprises: when the number of the current objects on which focusing fails is greater than a preset number, a prompt is given for focusing failure. Thus, a cause of focusing failure can be eliminated manually to avoid constant focusing, thus saving time. Specifically, in this case, the cause may be the wrong placements of the objects or the failure of the device for imaging. After a prompt for focusing failure is given, the cause of focusing failure can be eliminated manually. In one example, the preset number is 3, that is, when the number of the current objects on which focusing fails is greater than 3, a prompt is given for focusing failure. The way to give a prompt for focusing failure may be displaying an image or words, playing sound, etc.

In the present embodiment, the method for imaging further comprises: determining whether the position of a lens exceeds a first range, and quitting focusing when the position of the lens exceeds the first range. Thus, quitting focusing when the position of the lens exceeds the first range can prevent too long focusing time and an increase in power consumption.

Specifically, in the example of the aforementioned embodiment, the first range is [oPos+rLen, oPos−rLen].

In the present embodiment, as lens 104 moves, whether the current position of the lens 104 is beyond a fourth set position is determined; and when the current position of the lens 104 is beyond the fourth set position, the movement of the lens 104 is stopped. Thus, the first set position and the fourth set position can define the movement range (the first range) of the lens 104, so that the lens 104 can stop moving when focusing fails, preventing resource waste or equipment damage, or the lens 104 can refocus when focusing fails, increasing the automation degree of the method for imaging.

For example, in a total internal reflection system for imaging, in order to quickly find a medium interface, setting will be adjusted to make the movement range of the lens 104 as small as possible under the condition that the solution can be implemented. For example, on a total internal reflection device for imaging with a 60× objective, the movement range of the lens 104 may be set as 200 μm±10 μm or [190 μm, 250 μm] according to characteristics of optical path and experience.

In the present embodiment, another set position can be determined according to the setting of the determined movement range and any of the fourth set position and the first set position. In one example, the fourth set position is set as the position a depth of field lower than the lowest position of an upper surface 205 of the front panel 202 of the reaction device 200, the movement range of the lens 104 is set as 250 μm, and thus, the first set position is determined.

In the example of the present disclosure, the coordinate position corresponding to the position a depth of field lower is a position which becomes smaller along the negative direction of the Z axis.

Specifically, in the present embodiment, the movement range is an interval on the negative axis of the Z axis. In one example, the first set position is nearlimit, the fourth set position is farlimit, and the coordinate positions corresponding to nearlimit and farlimit are located on the negative axis of the Z axis; nearlimit is equal to −6000 um, and farlimit is equal to −6350 um. The movement range defined between nearlimit and farlimit is 350 um. Therefore, when the coordinate position corresponding to the current position of the lens 104 is less than the coordinate position corresponding to the fourth set position, it is determined that the current position of the lens 104 is beyond the fourth set position. In FIG. 10, the position of farlimit is the position a depth of field L lower than the lowest position of the upper surface 205 of the front panel 202 of the reaction device 200. The depth of field L is the depth of field of the lens 104.

It should be noted that, in other embodiments, the coordinate positions corresponding to the first set position and/or the fourth set position may be specifically set according to actual condition, which is not specifically limited herein.

In the present embodiment, the focusing module 106 comprises a light source 116 and an optical sensor 118, the light source 116 is configured for emitting light onto an object, and the optical sensor 118 is configured for receiving the light reflected by the object. Thus, the focusing module 106 can emit and receive light.

Specifically, in the embodiment of the present disclosure, the light source 116 may be an infrared light source 116, and the optical sensor 118 may be a photodiode. Therefore, the cost is low, and the accuracy of detection is high. Infrared light emitted by the light source 116 is reflected by a dichroic beam splitter to get into the objective 110, and is projected onto the sample 300 and an object by the objective 110. The object can reflect the infrared light projected by the objective 110. In the embodiment of the present disclosure, when the sample 300 comprises the carrying device 200 and the test sample 302, the received light reflected by the object is the light reflected by the lower surface 204 of the front panel of the carrying device 200.

Whether the infrared light reflected by the object can get into the objective 110 and be received by the optical sensor 118 mainly depends on the distance between the objective 110 and the object. Therefore, when it is determined that the focusing module 106 receives the infrared light reflected by the object, it can be determined that the distance between the objective 110 and the object is within an appropriate optical imaging range and can be used for imaging by the device for imaging 102. In one example, the distance is 20 um to 40 um.

At this point, the lens 104 is moved at the second set step length which is smaller than the first set step length, so that the system for imaging can find the best imaging position of the lens 104 in a smaller range.

In the present embodiment, referring to FIG. 13, when the focusing module 106 receives the light reflected by the object, the method for imaging further comprises: (g) moving the lens 104 toward the object at a third set step length less than the first set step length and greater than the second set step length, calculating a first light intensity parameter according to the light intensity of the light received by the focusing module 106, and determining whether the first light intensity parameter is greater than a first set light intensity threshold; and when the first light intensity parameter is greater than the first set light intensity threshold, performing step (d). Thus, by comparing the first light intensity parameter with the first set light intensity threshold, the interference of light signals much weaker than the light reflected by the medium interface on focusing can be eliminated.

When the first light intensity parameter is not greater than the first set light intensity threshold, the lens 104 continues to be moved toward the object at the third set step length.

In the present embodiment, the focusing module 106 comprises two optical sensors 118, the two optical sensors 118 are configured for receiving the light reflected by the object, and the first light intensity parameter is an average value of light intensities of light received by the two optical sensors 118. Thus, the first light intensity parameter is calculated by the average value of light intensities of light received by the two optical sensors 118, so that weak light signals can be more accurately eliminated.

Specifically, the first light intensity parameter may be set as SUM, i.e., SUM=(PD1+PD2)/2, and PD1 and PD2 respectively represent light intensities of light received by the two optical sensors 118. In one example, the first set light intensity threshold nSum is equal to 40.

In one example, the third set step length S2 is equal to 0.005 mm. It can be understood that, in other examples, the third set step length may also be other numerical values, which are not specifically defined herein.

Embodiment 2

It should be noted that, in the present embodiment, the structural diagram of the system for imaging in embodiment 1 can be adopted as the structural diagram of the system for imaging. It can be understood that the focusing method in embodiment 2 is different from the focusing method or focusing logic in embodiment 1, but the structures of the systems for imaging used are basically the same.

Figure 14:
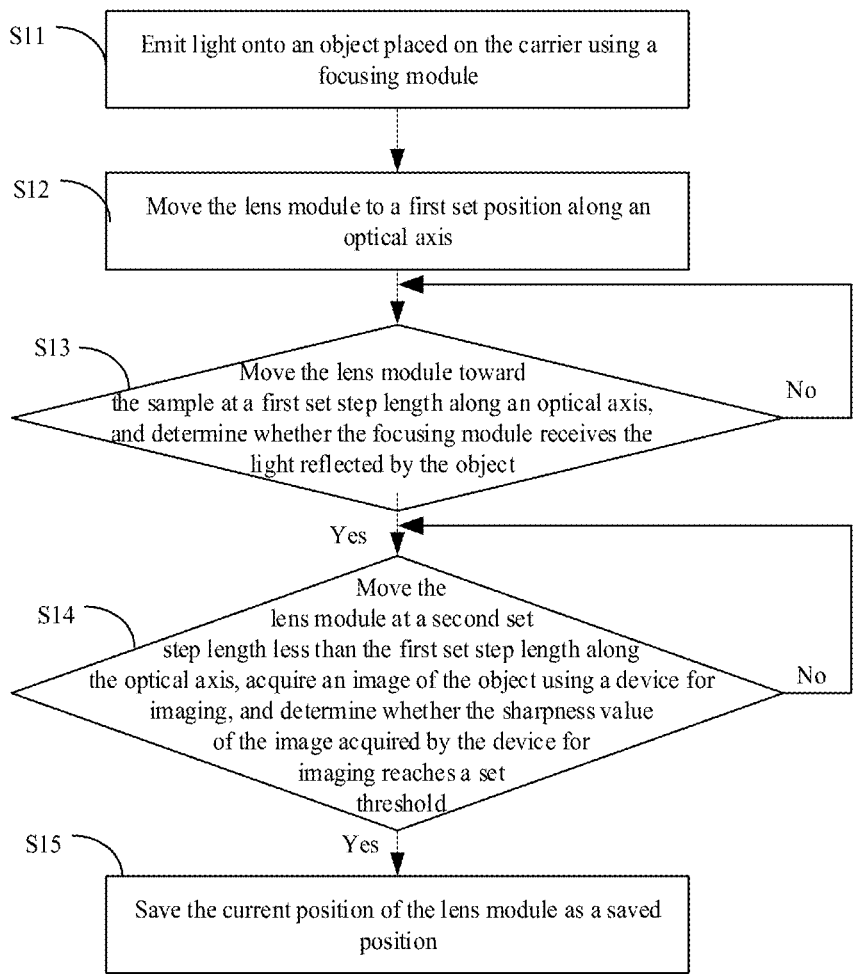
FIG. 14 is yet another schematic flow chart of the focusing method according to one embodiment of the present disclosure.

Referring to FIGS. 10, 11 and 14, focusing comprises the following steps: (S11) emitting light onto an object using the focusing module 106; (S12) moving the lens 104 to a first set position; (S13) moving the lens 104 from the first set position toward the object at a first set step length and determining whether the focusing module 106 receives the light reflected by the object; (S14) when the focusing module 106 receives the light reflected by the object, moving the lens 104 at a second set step length smaller than the first set step length, acquiring an image of the object using the device for imaging 102, and determining whether the sharpness value of the image acquired by the device for imaging 102 reaches a set threshold; and (S15) when the sharpness value of the image reaches the set threshold, saving the current position of the lens 104 as a saved position.

Using the aforementioned focusing method, a plane for clear imaging of a target object, i.e., a clear plane/clear surface, can be quickly and accurately found. The method is particularly suitable for a device comprising a precision optical system and having difficulty in finding a clear plane, such as an optical detection device with a high-magnification lens.

Specifically, in the aforementioned focusing step, the object is an object whose focal plane position needs to be acquired. For example, if a first predetermined relationship needs to be determined, two objects can be selected on a first preset track, and focusing is successively or simultaneously performed on the two objects on the first preset track 43 to acquire two sets of focal plane position data, wherein one set of focal plane position data serves as the focal plane position data of the first object 42 and the other serves as the focal plane position data of the second object 44; if a second predetermined relationship needs to be determined, two objects can be selected on a second preset track, focusing can be successively or simultaneously performed on the two objects located on the second preset track 45 to acquire two sets of focal plane position data, wherein one set of focal plane position data serves as the focal plane position data of the fourth object 47 and the other serves as the focal plane position data of the fifth object 48.

Referring to FIG. 10, in the embodiment of the present disclosure, objects are a plurality of positions (FOVs) of a sample 300 applied in sequence determination. Specifically, when the first predetermined relationship needs to be determined, the object for focusing may serve as a first object or a second object; and when the second predetermined relationship needs to be determined, the object for focusing may serve as a fourth object or a fifth object. The sample 300 comprises a carrying device 200 and a test sample 302 located on the carrying device. The test sample 302 is a biomolecule, such as a nucleic acid. The lens 104 is over the carrying device 200. The carrying device 200 is provided with a front panel 202 and a back panel (lower panel), each of which is provided with two surfaces, and the test sample 302 is connected to the upper surface of the lower panel, that is, the test sample 302 is located under the lower surface 204 of the front panel 202. In an embodiment of the present disclosure, because the device for imaging 102 acquires an image of the test sample 302, the test sample 302 is the corresponding position (FOV) during photographing. The test sample 302 is located under the lower surface 204 of the front panel 202 of the carrying device 200, and when a focusing process begins, the lens 104 moves in order to find a medium interface 204 where the test sample 302 is located so as to increase success rate of the device for imaging 102 in acquiring a clear image. In an embodiment of the present disclosure, the test sample 302 is a solution, the front panel 202 of the carrying device 200 is glass, and the medium interface 204 between the carrying device 200 and the test sample 302 is the lower surface 204 of the front panel 202 of the carrying device 200, i.e., the interface between two media (glass and liquid). The test sample 302 from which the device for imaging 102 needs to acquire an image is located under the lower surface 204 of the front panel 202, and at this time, a clear surface for the clear imaging of the test sample 302 is determined and found by the image acquired by the device for imaging 102. This process can be referred to as focusing. In one example, the thickness of the front panel 202 is 0.175 mm.

In the present embodiment, the carrying device 200 may be a slide, and the test sample 302 is placed on the slide or the test sample 302 is clamped between two slides. In some embodiments, the carrying device 200 may be a reaction device, e.g., a flowcell with an upper carrying panel and a lower carrying panel similar to a sandwich structure, and the test sample 302 is arranged on the flowcell.

In the present embodiment, referring to FIG. 11, the device for imaging 102 comprises a microscope 107 and a camera 108, the lens 104 comprises a microscope objective 110 and a camera lens 112, and the focusing module 106 can be fixed with the camera lens 112 through a dichroic beam splitter 114 which is located between the camera lens 112 and the objective 110. The dichroic beam splitter 114 comprises a dual c-mount splitter. The dichroic beam splitter 114 can reflect the light emitted by the focusing module 106 to the objective 110 and enable visible light to pass through the objective and get into the camera 108 via the camera lens 112, as shown in FIG. 11.

In an embodiment of the present disclosure, the lens 104 moves along the optical axis OP. The movement of the lens 104 may refer to the movement of the objective 110, and the position of the lens 104 may refer to the position of the objective 110. In other embodiments, other lenses of the lens 104 can be chosen to move to realize focusing. In addition, the microscope 107 further comprises a tube lens 111 located between the objective 110 and the camera 108.

In the present embodiment, the carrier can drive a sample 200 to move on a plane (e.g., an XY plane) perpendicular to the optical axis OP (e.g., the Z axis) of the lens 104 and/or drive a sample 300 to move along the optical axis OP (e.g., the Z axis) of the lens 104.

In other embodiments, the plane on which the sample 300 is driven by the carrier to move is not perpendicular to the optical axis OP, that is, the included angle between the movement plane of the sample and the XY plane is not 0, but the method for imaging is still applicable.

In addition, the device for imaging 102 can also drive the objective 110 to move along the optical axis OP of the lens 104 for focusing. In some embodiments, the device for imaging 102 drives the objective 110 to move using a driving part such as a step motor or a voice coil motor.

In the present embodiment, when a coordinate system is established, as shown in FIG. 10, the positions of the objective 110, the carrier and the sample 300 can be provided on the negative axis of the Z axis, and the first set position can be a coordinate position on the negative axis of the Z axis. It can be understood that in other embodiments, the relationship between the coordinate system and the camera and the relationship between the coordinate system and the objective 110 can also be adjusted according to actual condition, which is not specifically limited herein.

In one example, the device for imaging 102 comprises a total internal reflection fluorescent microscope, the magnification of the objective 110 is 60×, and the first set step length S1 is equal to 0.01 mm. Thus, the first set step length S1 is suitable, because a too large first set step length S1 will exceed an acceptable focusing range and a too small first set step length S1 will increase time consumption.

When the focusing module 106 does not receive the light reflected by the object, the lens 104 continues to be moved toward the sample 300 and the object at the first set step length along the optical axis OP.

In the present embodiment, when the sharpness value of the image does not reach the set threshold, the lens 104 continues to be moved along the optical axis OP at the second set step length.

In the present embodiment, the system for imaging can be applied to a sequence determination system, that is, the sequence determination system comprises the system for imaging.

In the present embodiment, as lens 104 moves, whether the current position of the lens 104 is beyond a second set position is determined; and when the current position of the lens 104 is beyond the second set position, the movement of the lens 104 is stopped or the focusing step is performed. Thus, the first set position and the second set position can define the movement range of the lens 104, so that the lens 104 can stop moving when focusing fails, preventing resource waste or equipment damage, or the lens 104 can refocus when focusing fails, increasing the automation degree of the method for imaging.

For example, in a total internal reflection system for imaging, in order to quickly find a medium interface, setting will be adjusted to make the movement range of the lens 104 as small as possible under the condition that the solution can be implemented. For example, on a total internal reflection device for imaging with a 60× objective, the movement range of the lens 104 may be set as 200 μm±10 μm or [190 μm, 250 μm] according to characteristics of optical path and experience.

In the present embodiment, another set position can be determined according to the setting of the determined movement range and any of the second set position and the first set position. In one example, the second set position is set as the position a depth of field lower than the lowest position of an upper surface 205 of the front panel 202 of the reaction device 200, the movement range of the lens 104 is set as 250 μm, and thus, the first set position is determined.

In the example of the present disclosure, the coordinate position corresponding to the position a depth of field lower is a position which becomes smaller along the negative direction of the Z axis.

Specifically, in the embodiment of the present disclosure, the movement range is an interval on the negative axis of the Z axis. In one example, the first set position is nearlimit, the second set position is farlimit, and the coordinate positions corresponding to nearlimit and farlimit are located on the negative axis of the Z axis; nearlimit is equal to −6000 um, and farlimit is equal to −6350 um. The movement range defined between nearlimit and farlimit is 350 um.

Therefore, when the coordinate position corresponding to the current position of the lens 104 is less than the coordinate position corresponding to the second set position, it is determined that the current position of the lens 104 is beyond the second set position. In FIG. 10, the position of farlimit is the position a depth of field L lower than the lowest position of the upper surface 205 of the front panel 202 of the reaction device 200. The depth of field L is the depth of field of the lens 104.

It should be noted that, in other embodiments, the coordinate positions corresponding to the first set position and/or the second set position may be specifically set according to actual condition, which is not specifically limited herein.

In the present embodiment, the focusing module 106 comprises a light source 116 and an optical sensor 118, the light source 116 is configured for emitting light onto an object, and the optical sensor 118 is configured for receiving the light reflected by the object. Thus, the focusing module 106 can emit and receive light.

Specifically, in the embodiment of the present disclosure, the light source 116 may be an infrared light source 116, and the optical sensor 118 may be a photodiode. Therefore, the cost is low, and the accuracy of detection is high. Infrared light emitted by the light source 116 is reflected by a dichroic beam splitter to get into the objective 110, and is projected onto the sample 300 and an object by the objective 110. The object can reflect the infrared light projected by the objective 110. In the embodiment of the present disclosure, when the sample 300 comprises the carrying device 200 and the test sample 302, the received light reflected by the object is the light reflected by the lower surface 204 of the front panel of the carrying device 200.

Whether the infrared light reflected by the object can get into the objective 110 and be received by the optical sensor 118 mainly depends on the distance between the objective 110 and the object. Therefore, when it is determined that the focusing module 106 receives the infrared light reflected by the object, it can be determined that the distance between the objective 110 and the object is within an appropriate optical imaging range and can be used for imaging by the device for imaging 102. In one example, the distance is 20 um to 40 um.

At this point, the lens 104 is moved at the second set step length which is smaller than the first set step length, so that the system for imaging can find the best imaging position of the lens 104 in a smaller range.

In the present embodiment, the sharpness value of the image can serve as an evaluation value of image focusing. In one example, whether the sharpness value of the image acquired by the device for imaging 102 reaches the set threshold can be determined by the hill climbing algorithm for image processing. Whether the sharpness value reaches a maximal value at a sharpness value peak is determined by calculating the sharpness value of the image outputted by the device for imaging 102 when the objective 110 is at each position, and whether the lens 104 reaches the position of a clear surface during imaging by the device for imaging 102 is then determined. It can be understood that, in other embodiments, other algorithms for image processing can also be used to determine whether the sharpness value reaches the maximal value at the peak.

When the sharpness value of the image reaches the set threshold, the current position of the lens 104 is saved as a saved position, which enable the device for imaging 102 to output a clear image when photographing in a sequence determination reaction.

Figure 15:
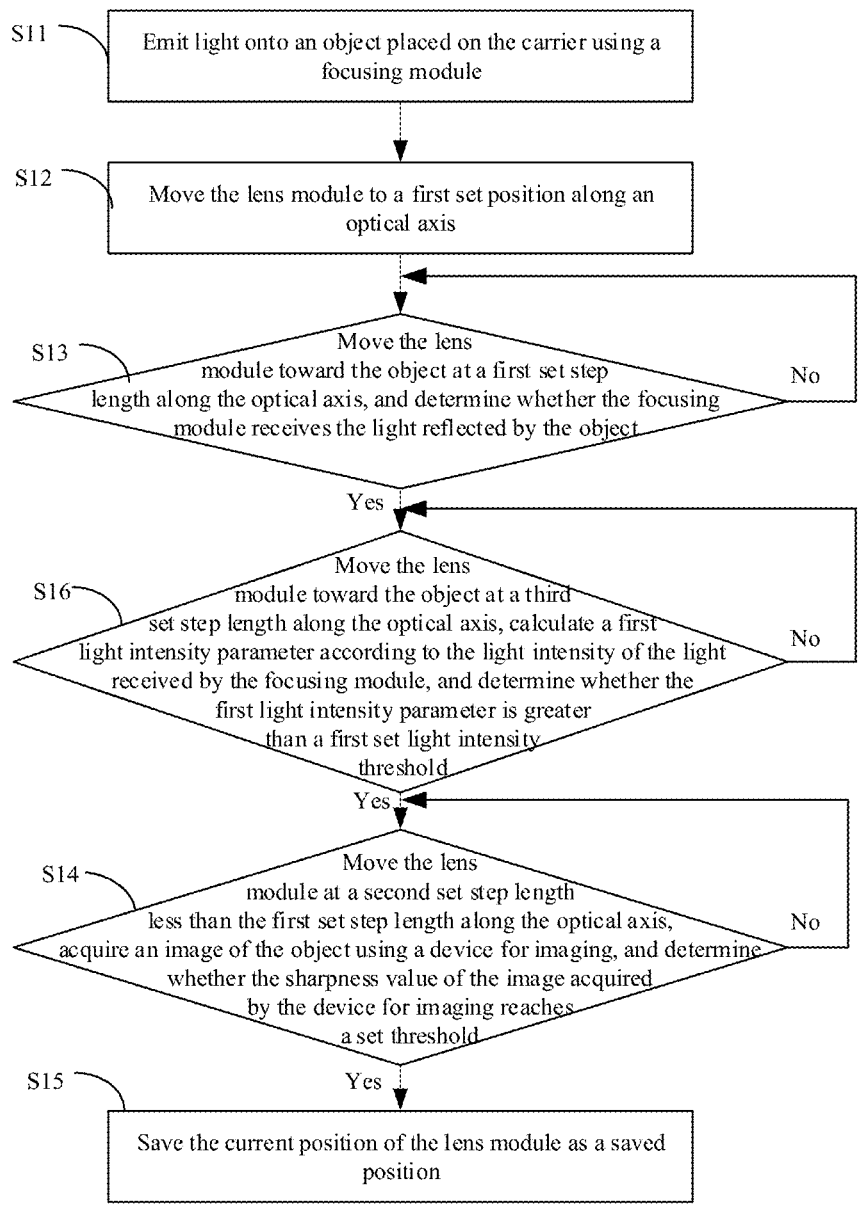
FIG. 15 is still another schematic flow chart of the focusing method according to one embodiment of the present disclosure.

In the present embodiment, referring to FIG. 15, when the focusing module 106 receives the light reflected by the object, focusing further comprises: (S16) moving the lens 104 toward the object at a third set step length less than the first set step length and greater than the second set step length, calculating a first light intensity parameter according to the light intensity of the light received by the focusing module 106, and determining whether the first light intensity parameter is greater than a first set light intensity threshold; and when the first light intensity parameter is greater than the first set light intensity threshold, performing step (S14). Thus, by comparing the first light intensity parameter with the first set light intensity threshold, the interference of light signals much weaker than the light reflected by the medium interface on focusing can be eliminated.

When the first light intensity parameter is not greater than the first set light intensity threshold, the lens 104 continues to be moved toward the object at the third set step length along the optical axis OP.

In the present embodiment, the focusing module 106 comprises two optical sensors 118, the two optical sensors 118 are configured for receiving the light reflected by an object, and the first light intensity parameter is an average value of light intensities of light received by the two optical sensors 118. Thus, the first light intensity parameter is calculated by the average value of light intensities of light received by the two optical sensors 118, so that weak light signals can be more accurately eliminated.

Specifically, the first light intensity parameter may be set as SUM, i.e., SUM=(PD1+PD2)/2, and PD1 and PD2 respectively represent light intensities of light received by the two optical sensors 118. In one example, the first set light intensity threshold nSum is equal to 40.

In one example, the third set step length S2 is equal to 0.005 mm. It can be understood that, in other examples, the third set step length may also be other numerical values, which are not specifically defined herein.

Figure 16:
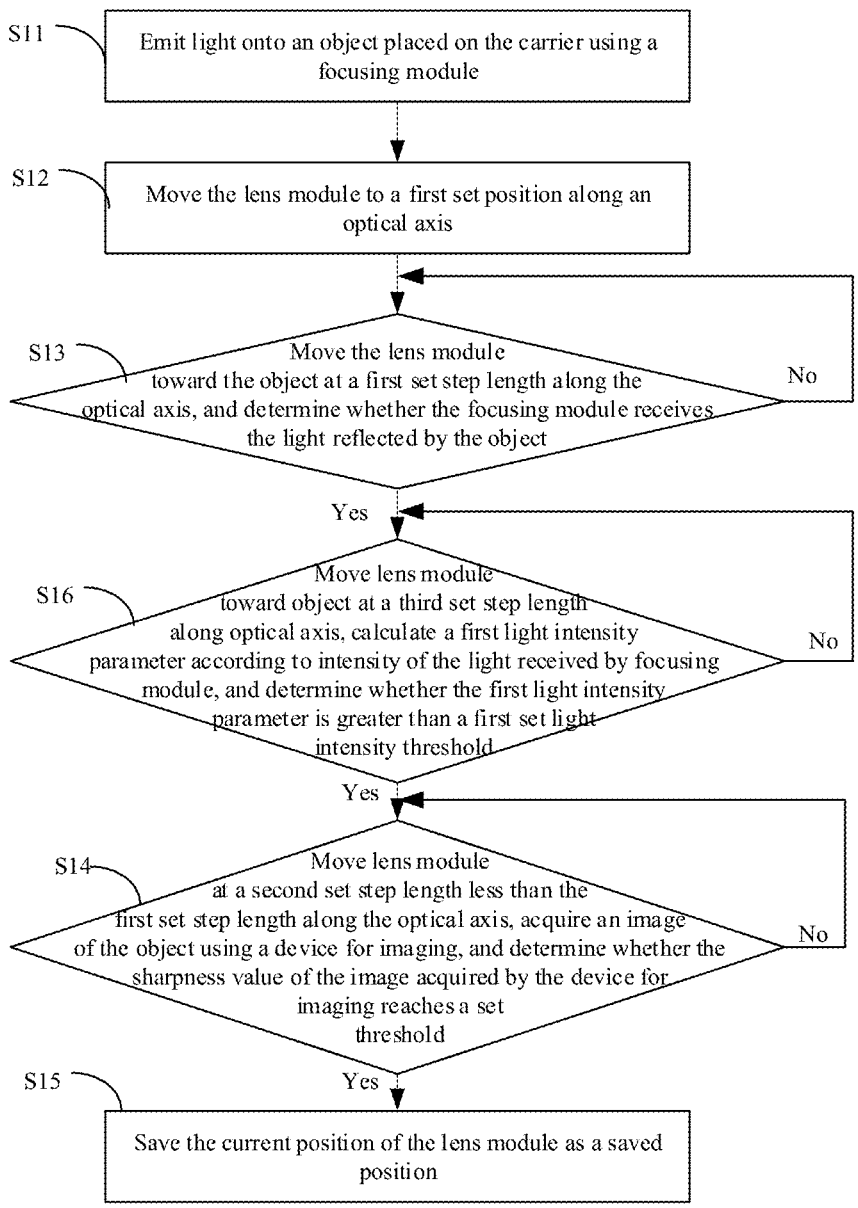
FIG. 16 is still yet another schematic flow chart of the focusing method according to one embodiment of the present disclosure.

In another embodiment, referring to FIG. 16, when the focusing module 106 receives the light reflected by the object, the imaging method further comprises: (S16) moving the lens 104 toward the object at a third set step length less than the first set step length and greater than the second set step length, calculating a first light intensity parameter according to the light intensity of the light received by the focusing module 106, and determining whether the first light intensity parameter is greater than a first set light intensity threshold; (S17) when the first light intensity parameter is greater than the first set light intensity threshold, moving the lens 104 toward the object at a fourth set step length less than the third set step length and greater than the second set step length, calculating a second light intensity parameter according to the light intensity of the light received by the focusing module 106, and determining whether the second light intensity parameter is less than a second set light intensity threshold; and when the second light intensity parameter is less than the second set light intensity threshold, performing step (S14). Thus, by comparing the first light intensity parameter with the first set light intensity threshold, the interference of light signals much weaker than the light reflected by the medium interface on focusing can be eliminated; and by comparing the second light intensity parameter with the second set light intensity threshold, the interference of strongly reflected light signals not from the position of the medium interface (e.g., light signals reflected by the oil surface of the objective 110/air) on focusing can be eliminated.

When the first light intensity parameter is not greater than the first set light intensity threshold, the lens 104 continues to be moved toward the object at the third set step length along the optical axis OP.

When the second light intensity parameter is not less than the second set light intensity threshold, the lens 104 continues to be moved toward the object at the fourth set step length along the optical axis OP.

In one example, the third set step length S2 is equal to 0.005 mm, and the fourth set step length S3 is equal to 0.002 mm. It can be understood that, in other examples, the third set step length and the fourth set step length may also be other numerical values, which are not specifically defined herein.

In the present embodiment, the focusing module 106 comprises two optical sensors 118, the two optical sensors 118 are configured for receiving the light reflected by the object, and the first light intensity parameter is an average value of the light intensities of the light received by the two optical sensors 118; the light intensities of the light received by the two optical sensors 118 have a first difference, and the second light intensity parameter is a difference between the first difference and a set compensated value. Thus, the second light intensity parameter is calculated by the light intensities of the light received by the two optical sensors 118, so that strongly reflected light signals can be more accurately eliminated.

Specifically, the first light intensity parameter may be set as SUM, i.e., SUM=(PD1+PD2)/2, and PD1 and PD2 respectively represent light intensities of light received by the two optical sensors 118. In one example, the first set light intensity threshold nSum is equal to 40. The difference may be set as err, the set compensated value is offset, that is, err=(PD1−PD2)−offset. In an ideal state, the first difference may be zero. In one example, the second set light intensity threshold nErr is equal to 10, and offset is equal to 30.

In the present embodiment, when the lens 104 is moved at the second set step length, whether the first sharpness value of the image corresponding to the current position of the lens 104 is greater than the second sharpness value of the image corresponding to the previous position of the lens 104 is determined; when the first sharpness value is greater than the second sharpness value and the sharpness difference between the first sharpness value and the second sharpness value is greater than a set difference, the lens 104 continues to be moved toward the object at the second set step length; when the first sharpness value is greater than the second sharpness value and the sharpness difference between the first sharpness value and the second sharpness value is less than the set difference, the lens 104 continues to be moved toward the object at a fifth set step length less than the second set step length, so that the sharpness value of the image acquired by the device for imaging 102 reaches the set threshold; when the second sharpness value is greater than the first sharpness value and the sharpness difference between the second sharpness value and the first sharpness value is greater than the set difference, the lens 104 is moved away from the object at the second set step length; and when the second sharpness value is greater than the first sharpness value and the sharpness difference between the second sharpness value and the first sharpness value is less than the set difference, the lens 104 is moved away from the object at the fifth set step length, so that the sharpness value of the image acquired by the device for imaging 102 reaches the set threshold. Thus, the position of the lens 104 corresponding to the sharpness value peak can be accurately found, so that the image outputted by the device for imaging is clear.

Specifically, the second set step length can serve as a rough adjustment step length Z1, the fifth set step length can serve as a fine adjustment step length Z2, and a rough adjustment range Z3 can be set. The setting of the rough adjustment range Z3 can stop the movement of the lens 104 when the sharpness value of the image cannot reach the set threshold, thus saving resources.

With the current position of the lens 104 as a starting point T, the rough adjustment range Z3 is an adjustment range, that is, the adjustment range on the Z axis is (T, T+Z3). The lens 104 is firstly moved in a first direction (such as a direction approaching the object along the optical axis OP) within the range of (T, T+Z3) at the step length Z1, and the first sharpness value R1 of the image acquired by the device for imaging 102 at the current position of the lens 104 is compared with the second sharpness value R2 of the image acquired by the device for imaging 102 at the previous position of the lens 104.

When R1>R2 and R1−R2>R0, it means that the sharpness value of the image is approaching the set threshold and is far from the set threshold, and therefore the lens 104 continues to move in the first direction at the step length Z1 to quickly approach the set threshold.

When R1>R2 and R1−R2<R0, it means that the sharpness value of the image is approaching the set threshold and is close to the set threshold, and therefore the lens 104 moves in the first direction at the step length Z2 to approach the set threshold at a smaller step length.

When R2>R1 and R2−R1>R0, it means that the sharpness value of the image has exceeded the set threshold and is far from the set threshold, and therefore the lens 104 moves in a second direction (such as a direction away from the object along the optical axis OP) opposite to the first direction at the step length Z1 to quickly approach the set threshold.

When R2>R1 and R2−R1<R0, it means that the sharpness value of the image has exceeded the set threshold and is close to the set threshold, and therefore the lens 104 moves in the second direction opposite to the first direction at the step length Z2 to approach the set threshold at a smaller step length.

In the present embodiment, as the lens 104 moves, the fifth set step length can be adjusted to adapt to the condition that the step length should not be too large or too small when approaching the set threshold.

In one example, T=0, Z1=100, Z2=40, Z3=2100, and the adjustment range is (0, 2100). It should be noted that the aforementioned values are metric values used when the lens 104 is moved in the process of image acquisition by the device for imaging 102, and the metric values are related to light intensity. The set threshold can be interpreted as a peak value of the focusing curve, a range with the peak as a center, or a range including the peak value.

Referring to FIG. 5, a system for imaging 100 according to the embodiment of the present disclosure is configured for imaging objects, wherein the system for imaging comprises a lens 104 and a control device 101, the objects comprise a first object 42, a second object 44 and a third object 46 located at different positions on a first preset track 43, the control device 101 comprises a computer-executable program, and the execution of the computer-executable program comprises the steps of the method for imaging according to any of the aforementioned embodiments.

In the aforementioned system for imaging 100, the first predetermined relationship is determined by the focusing positions of the first object 42 and the second object 44, and when other objects on the first preset track are imaged, focal planes can be directly predicted according to the first predetermined relationship to acquire a clear image of the third object without focusing. The system for imaging is particularly suitable for a scenario where there are a lot of objects and it is desired to quickly and continuously acquire images of these objects. The system is high in imaging efficiency and is able to accurately determine the focal plane positions of the subsequent objects to acquire the image information of the subsequent objects in continuous image acquisition even if the system for imaging fails to track the focus. The system used in cooperation with a focus tracking system of the system for imaging can provide a remedy in the event that the focus tracking system cannot normally track the focus again after it fails to track the focus.

It should be noted that the explanation and description of the technical features and benefits of the method for imaging in any of the aforementioned embodiments and examples are also applicable to the system for imaging 100 according to the present embodiment. Therefore, there will be no detailed description herein to avoid redundancy.

In some embodiments, the third object 46 is located between the first object 42 and the second object 44.

In some embodiments, the lens 104 is fixed and comprises an optical axis OP, and the first preset track 43 can move in a direction perpendicular or parallel to the optical axis OP.

In some embodiments, the determination of the first predetermined relationship comprises: focusing on the first object 42 using the system for imaging to determine first coordinates; focusing on the second object 44 using the system for imaging to determine second coordinates; and establishing the first predetermined relationship according to the first coordinates and the second coordinates, wherein the first coordinates represent a focal plane position of the first object 42, and the second coordinates represent a focal plane position of the second object 44.

In some embodiments, the first preset track 43 is a linear or non-linear track; and/or the first predetermined relationship is a linear relationship.

In some embodiments, the objects comprise a fourth object 47 and a fifth object 48 located at different positions on a second preset track 45, and the control device 101 is configured for:
allowing the lens 104 and the second preset track 45 to move relatively in a second predetermined relationship to acquire an image of the fifth object 48 using the system for imaging without focusing, wherein the second predetermined relationship is determined by a focal plane position of the fourth object 47 and the first predetermined relationship, and the second preset track 45 is different from the first preset track 43.

In some embodiments, the lens 104 is fixed and comprises an optical axis OP, and the second preset track 45 can move in a direction perpendicular or parallel to the optical axis OP.

In some embodiments, the determination of the second predetermined relationship comprises: focusing on the fourth object 47 using the system for imaging to determine fourth coordinates; and establishing the second predetermined relationship according to the first predetermined relationship and the fourth coordinates, wherein the fourth coordinates represent a focal plane position of the fourth object 47.

In some embodiments, the control device 101 is configured for: allowing, after acquiring the image of the third object 46, the lens 104 and the first preset track 43 and/or the second preset track 45 to move relatively to acquire an image of the fifth object 48 using the system for imaging without focusing.

In some embodiments, the system for imaging comprises a device for imaging 102 and a carrier 103. The device for imaging 102 comprises a lens 104 and a focusing module 106. The lens 104 comprises an optical axis OP, and the lens 104 can move in the direction of the optical axis OP. A first preset track 43 and/or a second preset track 45 are located on the carrier 103.

In some embodiments, the control device 101 is configured for performing the following steps: (a) emitting light onto the object using the focusing module 106; (b) moving the lens 104 to a first set position; (c) moving the lens 104 from the first set position toward the object at a first set step length and determining whether the focusing module 106 receives the light reflected by the object; (d) when the focusing module 106 receives the light reflected by the object, moving the lens 104 from the current position to a second set position, wherein the second set position is located within a first range, and the first range is a range including the current position and allowing the lens 104 to move in the direction of the optical axis OP; (e) moving the lens 104 from the second set position at a second set step length and acquiring an image of the object at a position of each step using the device for imaging 102, wherein the second set step length is less than the first set step length; and (f) evaluating the images of the object to abtain an image evaluation result, and focusing according to the image evaluation result.

In some embodiments, with the current position as a reference, the first range comprises a first interval and a second interval opposite to each other, the second interval is defined closer to the object, and step (e) comprises: (i) when the second set position is located within the second interval, moving the lens 104 from the second set position toward a direction away from the object and acquiring an image of the object at a position of each step using the device for imaging 102; or (ii) when the second set position is located within the first interval, moving the lens 104 from the second set position toward a direction close to the object and acquiring an image of the object at a position of each step using the device for imaging 102.

In some embodiments, step (f) comprises: comparing image evaluation result with a preset condition, and if the image evaluation result meets the preset condition, saving the position of the lens 104 corresponding to the image; if the image evaluation result does not meet the preset condition, moving the lens 104 to a third set position, wherein the third set position is located within another interval of the first range different from the interval where the second set position is located.

In some embodiments, the image evaluation result comprises a first evaluation value and a second evaluation value, the second set step length comprises a rough step length and a fine step length, and step (f) comprises: moving the lens 104 at the rough step length until the first evaluation value of the image at the corresponding position is not greater than a first threshold, moving the lens 104 at the fine step length until the second evaluation value of the image at the corresponding position is maximal, and saving the position of the lens 104 corresponding to the image when the second evaluation value is maximal.

In some embodiments, the image evaluation result comprises a first evaluation value, a second evaluation value and a third evaluation value, and the image comprises a plurality of pixels; the preset condition is: the number of spots on the image is greater than a preset value, the first evaluation value of the image at a corresponding position is not greater than a first threshold, and the second evaluation value of the image at the corresponding position is maximal among the second evaluation values of N images before and after the image at the corresponding position; or the preset condition is: the number of spots on the image is less than the preset value, the first evaluation value of the image at the corresponding position is not greater than the first threshold, and the third evaluation value of the image at the corresponding position is maximal among the third evaluation values of N images before and after the current image.

In some embodiments, the system for imaging comprises a spot detection module configured for: using k1×k2 matrices to detect the spots on the image, comprising determining that the matrix in which a central pixel value of the matrix is not less than any non-central pixel value of the matrix corresponds to a spot, wherein both k1 and k2 are odd numbers greater than 1, and the k1×k2 matrix comprises k1×k2 pixels.

In some embodiments, the central pixel value of the matrix corresponding to a spot is greater than a first preset value, any non-central pixel value of the matrix is greater than a second preset value, and the first preset value and the second preset value are related to an average pixel value of the image.

In some embodiments, the first evaluation value is determined by calculating the sizes of connected components corresponding to the spots of the image, the size Area of the connected component corresponding to a spot of the image is equal to A×B with A representing the size of the connected component in row centered on the center of the matrix corresponding to the spot and B representing the size of the connected component in column centered on the center of the matrix corresponding to the spot, and a connected component is defined as pixels connectivity greater than the average pixel value of the image.

In some embodiments, the second evaluation value and/or the third evaluation value is determined by calculating scores of the spots of the image, and the score of the spot of one image is equal to ((k1×k2−1)CV−EV)/((CV+EV)/(k1×k2)), wherein CV represents the central pixel value of the matrix corresponding to the spot, and EV represents the sum of the non-central pixel values of the matrix corresponding to the spot.

In some embodiments, the focusing module 106 comprises a light source 116 and an optical sensor 118, the light source 116 is configured for emitting light onto an object, and the optical sensor 118 is configured for receiving light reflected by the object.

In some embodiments, when the focusing module 106 receives the light reflected by the object, the control device 101 is further configured for: moving the lens 104 toward the object at a third set step length less than the first set step length and greater than the second set step length, calculating a first light intensity parameter according to the light intensity of the light received by the focusing module 106, and determining whether the first light intensity parameter is greater than a first set light intensity threshold; and moving the lens 104 from the current position to the second set position when the first light intensity parameter is greater than the first set light intensity threshold.

In some embodiments, the focusing module 106 comprises two optical sensors 118, the two optical sensors 118 are configured for receiving the light reflected by an object, and the first light intensity parameter is an average value of light intensities of light received by the two optical sensors 118.

In some embodiments, as the lens 104 moves, the control device 101 is configured for: determining whether the current position of the lens 104 is beyond a fourth set position; and when the current position of the lens 104 is beyond the fourth set position, stopping the movement of the lens 104.

In some embodiments, the control device 101 is configured for: emitting light onto the object using the focusing module 106; moving the lens 104 to a first set position; moving the lens 104 from the first set position toward the object at a first set step length and determining whether the focusing module 106 receives the light reflected by the object; when the focusing module 106 receives the light reflected by the object, moving the lens 104 at a second set step length less than the first set step length, acquiring an image of the object using the device for imaging 102, and determining whether a sharpness value of the image acquired by the device for imaging 102 reaches a set threshold;

and when the sharpness value of the image reaches the set threshold, saving the current position of the lens 104 as a saved position.

In some embodiments, the focusing module 106 comprises a light source 116 and an optical sensor 118, the light source 116 is configured for emitting light onto an object, and the optical sensor 118 is configured for receiving light reflected by the object.

In some embodiments, when the focusing module 106 receives the light reflected by the object, the control device 101 is configured for: moving the lens 104 toward the object at a third set step length less than the first set step length and greater than the second set step length, calculating a first light intensity parameter according to the light intensity of the light received by the focusing module 106, and determining whether the first light intensity parameter is greater than a first set light intensity threshold; and when the first light intensity parameter is greater than the first set light intensity threshold, moving the lens 104 at the second set step length, acquiring an image of the object using the device for imaging 102, and determining whether a sharpness value of the image acquired by the device for imaging 102 reaches a set threshold.

In some embodiments, the focusing module 106 comprises two optical sensors 118, the two optical sensors 118 are configured for receiving the light reflected by an object, and the first light intensity parameter is an average value of light intensities of light received by the two optical sensors 118.

In some embodiments, when the focusing module 106 receives the light reflected by the object, the control device 101 is configured for: moving the lens 104 toward the object at a third set step length less than the first set step length and greater than the second set step length, calculating a first light intensity parameter according to the light intensity of the light received by the focusing module 106, and determining whether the first light intensity parameter is greater than a first set light intensity threshold; and when the first light intensity parameter is greater than the first set light intensity threshold, moving the lens 104 toward the object at a fourth set step length less than the third set step length and greater than the second set step length, calculating a second light intensity parameter according to the light intensity of the light received by the focusing module 106, and determining whether the second light intensity parameter is less than a second set light intensity threshold; and when the second light intensity parameter is less than the second set light intensity threshold, moving the lens 104 at the second set step length, acquiring an image of the object using the device for imaging 102, and determining whether a sharpness value of the image acquired by the device for imaging 102 reaches a set threshold.

In some embodiments, the focusing module 106 comprises two optical sensors 118, the two optical sensors 118 are configured for receiving the light reflected by the object, and the first light intensity parameter is an average value of the light intensities of the light received by the two optical sensors 118; the light intensities of the light received by the two optical sensors 118 have a first difference, and the second light intensity parameter is a difference between the first difference and a set compensated value.

In some embodiments, when the lens 104 is moved at the second set step length, the control device 101 is configured for: determining whether the first sharpness value of the image corresponding to the current position of the lens 104 is greater than the second sharpness value of the image corresponding to the previous position of the lens 104; when the first sharpness value is greater than the second sharpness value and a sharpness difference between the first sharpness value and the second sharpness value is greater than a set difference, moving the lens 104 toward the object at the second set step length; when the first sharpness value is greater than the second sharpness value and the sharpness difference between the first sharpness value and the second sharpness value is less than the set difference, moving the lens 104 toward the object at a fifth set step length less than the second set step length such that the sharpness value of the image acquired by the device for imaging 102 reaches the set threshold; when the second sharpness value is greater than the first sharpness value and the sharpness difference between the second sharpness value and the first sharpness value is greater than the set difference, moving the lens 104 away from the object at the second set step length; and when the second sharpness value is greater than the first sharpness value and the sharpness difference between the second sharpness value and the first sharpness value is less than the set difference, moving the lens 104 away from the object at the fifth set step length such that the sharpness value of the image acquired by the device for imaging 102 reaches the set threshold.

In some embodiments, as the lens 104 moves, the control device 101 is configured for: determining whether the current position of the lens 104 is beyond a second set position; and when the current position of the lens 104 is beyond the second set position, stopping the movement of the lens 104 or performing focusing.

A computer-readable storage medium according to an embodiment of the present disclosure is configured for storing a program for execution by a computer, and the execution of the program comprises implementing the steps of the method for imaging according to any of the aforementioned embodiments. The computer-readable storage medium may include: read-only memory, random access memory, magnetic disk, optical disk, or the like.

A computer program product according to an embodiment of the present disclosure comprises instructions, which enable a computer to implement the steps of the method for imaging according to any of the aforementioned embodiments when executed by the computer.

In the description of this specification, the description of the terms "one embodiment", "some embodiments", "schematic embodiments", "examples", "specific examples", "some examples" or the like, means that the particular features, structures, materials or characteristics comprised in the embodiments or examples are included in at least one embodiment or example of the present disclosure. In this specification, the schematic description of the aforementioned terms do not necessarily refer to the same embodiment or example. Moreover, the particular features, structures, materials or characteristics described may be combined in any embodiment or example in any appropriate manner.

In addition, each functional unit in each embodiment of the present disclosure may be integrated in one processing module, or each unit may physically exist alone, or two or more than two units may be integrated in one module. The above-mentioned integrated module may be implemented in the form of hardware or in the form of software functional modules. The integrated module may also be stored in a computer-readable storage medium if it is implemented in the form of a software functional module and is sold or used as standalone products.

Although the embodiments of the present disclosure have been shown and described above, it is to be understood that the aforementioned embodiments are exemplary and are not to be construed as limiting the present disclosure, and that those of ordinary skill in the art may make changes, modifications, replacements and variations to such embodiments, without departing from the scope of the present disclosure.

What is claimed is:

1. A method of imaging, wherein the method uses a system for imaging to image an object, the system for imaging comprises a lens, and the object comprises a first object, a second object and a third object located at different positions on a first preset track, wherein the third object is located between the first object and the second object, the method comprising:
   allowing the lens and the first preset track to move relatively in a first predetermined relationship to acquire a clear image of the third object using the system for imaging without focusing, the clear image of the third object being acquired when the third object is maintained within a depth of field of the lens, and the first predetermined relationship being determined by a focal plane position of the first object and a focal plane position of the second object.

2. The method according to claim 1, wherein the determination of the first predetermined relationship comprises:
   focusing on the first object using the system for imaging to determine first coordinates;
   focusing on the second object using the system for imaging to determine second coordinates; and
   establishing the first predetermined relationship according to the first coordinates and the second coordinates, wherein the first coordinates represent the focal plane position of the first object, and the second coordinates represent the focal plane position of the second object.

3. The method according to claim 1, wherein the object comprises a fourth object and a fifth object located at different positions on a second preset track, the method comprising:
   allowing the lens and the second preset track to move relatively in a second predetermined relationship to acquire a clear image of the fifth object using the system for imaging without focusing, wherein the clear image of the fifth object is acquired when the fifth object is maintained within a depth of field of the lens, wherein the second predetermined relationship is determined by a focal plane position of the fourth object and the first predetermined relationship, and wherein the second preset track is different from the first preset track.

4. The method according to claim 3, wherein the lens is fixed and comprises an optical axis, and the first preset track or the second preset track can move in a direction perpendicular or parallel to the optical axis.

5. The method according to claim 3, wherein the determination of the second predetermined relationship comprises:
   focusing on the fourth object using the system for imaging to determine fourth coordinates; and
   establishing the second predetermined relationship according to the first predetermined relationship and the fourth coordinates, wherein the fourth coordinates represent the focal plane position of the fourth object.

6. The method according to claim 5, wherein the system for imaging comprises a device for imaging and a carrier, the device for imaging comprises the lens and a focusing module, the lens comprises an optical axis and can move in the direction of the optical axis to perform the focusing, and the first preset track and the second preset track are located on the carrier.

7. The method according to claim 6, wherein the focusing comprises:
   (a) emitting light onto the object using the focusing module;
   (b) moving the lens to a first set position;
   (c) moving the lens from the first set position toward the object at a first set step length and determining whether the focusing module receives the light reflected by the object;
   (d) when the focusing module receives the light reflected by the object, moving the lens from a current position to a second set position, wherein the second set position is located within a first range, and the first range is a range comprising the current position and allowing the lens to move in the direction of the optical axis;
   (e) moving the lens from the second set position at a second set step length and acquiring an image of the object at a position of each step using the device for imaging, wherein the second set step length is less than the first set step length; and
   (f) evaluating the images of the object to obtain an image evaluation result and focusing according to the image evaluation result.

8. The method according to claim 7, wherein, when the focusing module receives the light reflected by the object, the focusing further comprises the following steps:
   moving the lens toward the object at a third set step length less than the first set step length and greater than the second set step length, calculating a first light intensity parameter according to the light intensity of the light received by the focusing module, and determining whether the first light intensity parameter is greater than a first set light intensity threshold; and
   moving the lens from the current position to the second set position when the first light intensity parameter is greater than the first set light intensity threshold.

9. The method according to claim 7, wherein, with the current position as a reference, the first range comprises a first interval and a second interval opposite to each other, the second interval is defined closer to the object than the first interval, and step (e) comprises:
   (i) when the second set position is located within the second interval, moving the lens from the second set position in a direction away from the object and acquiring an image of the object at a position of each step using the device for imaging; or
   (ii) when the second set position is located within the first interval, moving the lens from the second set position in a direction toward the object and acquiring an image of the object at a position of each step using the device for imaging.

10. The method according to claim 9, wherein step (f) comprises: comparing the image evaluation result with a preset condition, and if the image evaluation result meets the preset condition, saving the position of the lens corresponding to the image;
    if the image evaluation result does not meet the preset condition, moving the lens to a third set position, wherein the third set position is located within the other interval of the first range different from the interval where the second set position is located.

11. The method according to claim 10, wherein the image evaluation result comprises a first evaluation value and a second evaluation value, the second set step length comprises a rough step length and a fine step length, and step (f) comprises: moving the lens at the rough step length until the first evaluation value of the image at a corresponding position is not greater than a first threshold, moving the lens at the fine step length until the second evaluation value of the image at a corresponding position is maximal, and saving the position of the lens corresponding to the image when the second evaluation value is the maximum value.

12. The method according to claim 10, wherein the image evaluation result comprises a first evaluation value, a second evaluation value and a third evaluation value, and the image comprises a plurality of pixels;
    the preset condition is: the number of spots on the image is greater than a preset value, the first evaluation value of the image at a corresponding position is not greater than a first threshold, and the second evaluation value of the image at the corresponding position is maximal among the second evaluation values of N images before and after the image at the corresponding position; or
    the preset condition is: the number of spots on the image is less than the preset value, the first evaluation value of the image at the corresponding position is not greater than the first threshold, and the third evaluation value of the image at the corresponding position is maximal among the third evaluation values of N images before and after the current image.

13. The method according to claim 12, wherein the following method is used to detect the spots on the image:
    using k1×k2 matrices to detect the spots on the image, comprising determining that a matrix in which a central pixel value of the matrix is not less than any non-central pixel value of the matrix corresponds to a spot, wherein both k1 and k2 are odd numbers greater than 1, and the k1×k2 matrix comprises k1×k2 pixels.

14. The method according to claim 13, wherein the central pixel value of the matrix corresponding to a spot is greater than a first preset value, any non-central pixel value of the matrix is greater than a second preset value, and the first preset value and the second preset value are related to an average pixel value of the image.

15. The method according to claim 14, wherein the first evaluation value is determined by calculating sizes of connected components corresponding to the spots of the image, a size Area of a connected component corresponding to a spot of the image is equal to A×B with A representing the size of the connected component in row centered on the center of the matrix corresponding to the spot and B representing the size of the connected component in column centered on the center of the matrix corresponding to the spot, and a connected component is defined as pixels connectivity greater than the average pixel value of the image.

16. The method according to claim 13, wherein the second evaluation value or the third evaluation value is determined by calculating scores of the spots of the image, and the score of a spot of the image is equal to $((k1 \times k2-1)CV-EV)/((CV+EV)/(k1 \times k2))$, CV representing the central pixel value of the matrix corresponding to the spot and EV representing the sum of the non-central pixel values of the matrix corresponding to the spot.

17. The method according to claim 3, comprising: allowing, after acquiring the clear image of the third object, the lens and the first preset track or the second preset track to move relatively to acquire the clear image of the fifth object using the system for imaging without focusing.

18. A system, comprising a lens and a control device, wherein the object comprises a first object, a second object and a third object located at different positions on a first preset track, the control device comprises a computer-executable program, and the execution of the computer-executable program comprises performing the method of claim 1.

19. A computer program product comprising instructions, wherein, when executed by a computer, the instructions enable the computer to implement the method of claim 1.

* * * * *